(12) United States Patent
Mills et al.

(10) Patent No.: US 8,839,249 B2
(45) Date of Patent: Sep. 16, 2014

(54) CUSTOMIZING AUTOMATED PROCESS MANAGEMENT

(75) Inventors: David Mills, San Antonio, TX (US); Christopher Brown, Cibolo, TX (US); Clayton Scott, New Braunfels, TX (US)

(73) Assignee: Rackspace US, Inc., San Antonio, TX (US)

( * ) Notice: Subject to any disclaimer, the term of this patent is extended or adjusted under 35 U.S.C. 154(b) by 672 days.

(21) Appl. No.: 13/011,213

(22) Filed: Jan. 21, 2011

(65) Prior Publication Data
US 2012/0192187 A1 Jul. 26, 2012

(51) Int. Cl.
*G06F 9/46* (2006.01)

(52) U.S. Cl.
CPC .......................................... *G06F 9/46* (2013.01)
USPC .......................................... 718/100; 705/7.26

(58) Field of Classification Search
None
See application file for complete search history.

(56) References Cited

U.S. PATENT DOCUMENTS

| | | | |
|---|---|---|---|
| 6,868,413 B1 * | 3/2005 | Grindrod et al. | 706/59 |
| 7,373,310 B1 * | 5/2008 | Homsi | 705/7.12 |
| 7,688,951 B1 * | 3/2010 | Bajpay et al. | 379/9.03 |
| 2006/0143034 A1 * | 6/2006 | Rothermel et al. | 705/1 |
| 2007/0083406 A1 * | 4/2007 | Cummins | 705/7 |
| 2007/0282576 A1 * | 12/2007 | Butine | 703/6 |
| 2009/0007056 A1 * | 1/2009 | Prigge et al. | 717/104 |
| 2012/0016833 A1 * | 1/2012 | Janiesch et al. | 706/50 |

OTHER PUBLICATIONS

Formalization of Functional Aspects in Business Software Globalization Andrej Danko Published: Oct. 29, 2010.*
The Process Recombinator: a tool for generating new business process ideas Abraham Bernstein, Mark Klein, and Thomas W. Malone Published: 1999.*
Managing Process Variants in the Process Lifecycle Alena Hallerbach, Thomas Bauer, Manfred Reichert Published: 2008.*
The process of building a Process Manager: Architecture and design patterns C. J. Paul Published: 2007.*
Modeling Workflows with a Process-view Approach Duen-Ren Liu and Minxin Shen Published: 2001.*

* cited by examiner

*Primary Examiner* — Emerson Puente
*Assistant Examiner* — Paul Mills
(74) *Attorney, Agent, or Firm* — Trop, Pruner & Hu, P.C.

(57) ABSTRACT

Embodiments of an event-driven process management and automation system are disclosed. Such system may be particularly appropriate for a multi-tenant environment so that a single process handling flow may be generated for a given process. Because in a multi-tenant environment many different entities may desire to customize or optimize this process handling flow for their particular usage, modifications to the process flow may be easily handled by a non-technical user to realize process modification without incurring additional development costs. Using a multi-level hierarchical inheritance model in accordance with an embodiment of the present invention, a process may be standardized, with focused customization available on a macro and/or micro level.

14 Claims, 20 Drawing Sheets

|  | 1. INVITATION | 2. EXECUTION (BRUNCH) | 3. CLOSING (CLEAN UP) |
|---|---|---|---|
| CORPORATE | INVITE MOTHER TO BRUNCH<br>INVITE M-IN-LAW TO BRUNCH | COOK EGGS<br>SET UP TABLE & SERVE FOOD | BEGIN CLEAN-UP<br>HINT FOR GUESTS TO LEAVE |
| SEGMENT | INVITE MOTHER TO BRUNCH | INHERITED | TELL EVERYONE TIME TO LEAVE<br>(ENFORCED) |
| ACCOUNT | INVITE MOTHER TO BRUNCH<br>INVITE BROTHER TO BRUNCH | INHERITED | |
| A EXECUTED | INVITE MOTHER TO BRUNCH | COOK EGGS<br>SET UP TABLE & SERVE FOOD | TELL EVERYONE TIME TO LEAVE |
| B EXECUTED | INVITE MOTHER TO BRUNCH<br>INVITE BROTHER TO BRUNCH | COOK EGGS<br>SETUP TABLE & SERVE FOOD | TELL EVERYONE TIME TO LEAVE |

GET PROCESS-STACK ALL MATCHES (GET MODULES)

| 300 | | 1 | 2 | 3 | 4 | 6 |
|---|---|---|---|---|---|---|
| ORG. UNIT | APPLICATION | 1-A | 2-A | 3-A | 4-A | 6-A |
| | SOURCE | 1-B | CORRECTIVE | CLOSING AC- | INITIAL MESSAG- | CLOSING AC- |
| | TYPE | INITIAL MESSAG- | 2-C | 3-D | 4-C | CLOSING AC- |
| | GROUP | INITIAL MESSAG- | CORRECTIVE | CLOSING AC- | INITIAL MESSAG- | CLOSING AC- |
| | EVENT | INITIAL MESSAG- | CORRECTIVE | CLOSING AC- | 4-E | CLOSING AC- |
| SEGMENT | APPLICATION | INITIAL MESSAG- | CORRECTIVE | CLOSING AC- | INITIAL MESSAG- | CLOSING AC- |
| | SOURCE | INITIAL MESSAG- | CORRECTIVE | CLOSING AC- | INITIAL MESSAG- | 6-G |
| | TYPE | INITIAL MESSAG- | CORRECTIVE | CLOSING AC- | INITIAL MESSAG- | CLOSING AC- |
| | GROUP (DT EXC.) | 1-K | CORRECTIVE | CLOSING AC- | INITIAL MESSAG- | CLOSING AC- |
| | EVENT | 1-L | CORRECTIVE | CLOSING AC- | INITIAL MESSAG- | CLOSING AC- |
| TEAM | APPLICATION | 1-M | CORRECTIVE | CLOSING AC- | INITIAL MESSAG- | CLOSING AC- |
| | SOURCE | 1-N | CORRECTIVE | CLOSING AC- | INITIAL MESSAG- | CLOSING AC- |
| | TYPE | INITIAL MESSAG- | CORRECTIVE | CLOSING AC- | INITIAL MESSAG- | CLOSING AC- |
| | GROUP | INITIAL MESSAG- | CORRECTIVE | CLOSING AC- | INITIAL MESSAG- | CLOSING AC- |
| | EVENT | INITIAL MESSAG- | CORRECTIVE | CLOSING AC- | INITIAL MESSAG- | CLOSING AC- |

FIG. 6B

| 300 | | 1 | 2 | 3 | 4 | 6 |
|---|---|---|---|---|---|---|
| ACCOUNT | APPLICATION | INITIAL MESSAG- | CORRECTIVE-AC | CLOSING AC- | INITIAL MESSAG- | CLOSING AC- |
| | CUSTOM SET 1 | INITIAL MESSAG- | CORRECTIVE | CLOSING AC- | INITIAL MESSAG- | CLOSING AC- |
| | CUSTOM SET 2 | INITIAL MESSAG- | CORRECTIVE | CLOSING AC- | INITIAL MESSAG- | CLOSING AC- |
| | CUSTOM SET 3 | INITIAL MESSAG- | CORRECTIVE | CLOSING AC- | INITIAL MESSAG- | CLOSING AC- |
| | SOURCE | 1-∅ | CORRECTIVE | CLOSING AC- | INITIAL MESSAG- | CLOSING AC- |
| | TYPE | INITIAL MESSAG- | CORRECTIVE-AC | CLOSING AC- | 4-Y | CLOSING AC- |
| | TYPE (TB EXC) | INITIAL MESSAG- | CORRECTIVE | CLOSING AC- | INITIAL MESSAG- | CLOSING AC- |
| | GROUP | INITIAL MESSAG- | CORRECTIVE | CLOSING AC- | INITIAL MESSAG- | CLOSING AC- |
| | EVENT | 1-AA | CORRECTIVE | CLOSING AC- | 4-Z | CLOSING AC- |
| DEVICE | APPLICATION | INITIAL MESSAG- | CORRECTIVE-AC | CLOSING AC- | INITIAL MESSAG- | CLOSING AC- |
| | SOURCE | INITIAL MESSAG- | CORRECTIVE | CLOSING AC- | 4-BB | CLOSING AC- |
| | SOURCE (TB EXC) | INITIAL MESSAG- | CORRECTIVE | 3-DD | INITIAL MESSAG- | CLOSING AC- |
| | SOURCE (DT EXC) | INITIAL MESSAG- | 2-EE | CLOSING AC- | INITIAL MESSAG- | CLOSING AC- |
| | TYPE | INITIAL MESSAG- | CORRECTIVE | CLOSING AC- | INITIAL MESSAG- | CLOSING AC- |
| | GROUP | INITIAL MESSAG- | CORRECTIVE | CLOSING AC- | INITIAL MESSAG- | CLOSING AC- |
| | EVENT | INITIAL MESSAG- | CORRECTIVE | CLOSING AC- | 4-FF | CLOSING AC- |

ARIC 2.0:: SEND E-MAIL

| SEARCH | CLEAR |

- ALERT GROUP NAME
- CAM TICKET
- DATACENTER
- DESCRIPTION
- DNS HOSTNAME
- DNS SERVER ADDRESS
- ENTRYTIMESTAMP
- EVENT OPTIONAL PARAMETER
- EVENT TYPE
- EVENTID
- FRIENDLY (PRIMARY) EVENT NAME
- FTP FILE
- FTP SERVER
- FTP USERNAME
- INVALID CERTS ON/OFF
- MATCH CONTENT
- MONITOR NAME
- NUMBER OF RETRIES

CORE ELEMENTS (SUBJECT)
MESSAGE ELEMENTS
DEVICE ELEMENTS

COMPOSER

EMAIL FROM
○ INHERITED
◉ CUSTOMIZED   FROM: [TEST@TEST.COM]
☐ ENFORCED

EMAIL TO              SEPARATE MULTIPLE EMAIL IDS WITH SEMICOLON
○ INHERITED
◉ CUSTOMIZED   TO: [TEST@TEST.COM]
☐ ENFORCED

SUBJECT
○ INHERITED
◉ CUSTOMIZED   [SUB-ELEMENT = SUBJECT]
☐ ENFORCED

BODY
○ INHERITED
◉ CUSTOMIZED   TYPE TEXT IN THESE FIELDS AND/OR DRAG
☐ ENFORCED     VARIABLES FROM LEFT-HAND PANEL.

[APPLY CHANGES]   [CANCEL]

FIG. 12D

CUSTOMIZING AUTOMATED PROCESS MANAGEMENT

BACKGROUND

In many different areas, businesses implement certain types of automated processes. In doing so, the time and expense for manually handling a given process can be avoided. While many different types of processes can exist in different business environments, some common types of automated processing environments include processes for monitoring responses or events occurring in computers or other similar types of systems, business processes for handling various operations within a business, and customer processes, particularly with regard to handling processes related to initialization, configuration and control of customer computer equipment.

While automating any of these and other processes is a goal, the automation can be difficult, given that there can be many different operations that are to be performed, and these may be specialized depending on a given environment. Accordingly, current process automation systems are inherently limited by the wide variety of processes that can be implemented, by the many different types of operators, and so forth.

One area in which automated processes can occur is a computer network such as a network of interconnected server computers, such as the commonly known server farm. Typically in such a server farm, certain processes with regard to monitoring, fault management and so forth can be automated. This is particularly so, as generally in a server farm, all of the existing servers are of a single entity, and thus requirements or desires of the entity are uniform across the various servers.

However, in other computer network environments, a single entity situation may not be present. That is, other types of computer networks can be of a multi-tenant environment, in which various servers or portions thereof are associated with a given customer. This type of situation can be present in a hosting environment, such as a web host, storage host or a similar such hosted environment. In addition, with the growing importance of cloud computing in which computing capabilities and application execution can be separated from a user, the multi-tenant environment can provide many challenges in attempting to automate processes.

SUMMARY OF INVENTION

According to one aspect of the present invention, a method can be used to determine an automated process to be performed responsive to an event occurring on a computer system. More specifically, in one embodiment a method includes receiving, in a process determination module, an event occurring on a system of a multi-tenant environment. Responsive to receipt of this event, a process stack of a database coupled to the process determination module can be accessed. The process stack can include, in one embodiment, a matrix for a process associated with the event, where the process has various modules, and the matrix includes for each module, multiple entries each corresponding to a business unit entity and process level. Stored in each of these entries may be a value that is one of a customized value, an enforced value, or an inherited value. Then from this stack, an execution stack can be generated that includes for each module the entries having a customized value or an enforced value. From this stack, an entry may be selected for each module of the process, in order to build an actual process, which in one embodiment, can be stored in a process action matrix coupled to the process determination module.

As one example, the actual process can be built by performing a first layer of inheritance analysis on the execution stack. This analysis may include determining if any entries of a module in the execution stack have an enforced value, and if so selecting the entry having the enforced value and that is associated with a highest business hierarchy level to be the selected entry. Otherwise, the entry of the module in the execution stack having the customized value and that is associated with a lowest business hierarchy level can be selected as the selected entry. This first level of inheritance analysis determines which modules and their actual steps, or elements, will be followed in the process. Next, to determine the details of each of the process steps, or sub-elements, to be performed during execution of the module, a second layer of inheritance analysis may be performed on the selected entry of the actual process and at least some entries of the execution stack. This analysis may include determining whether the selected sub-element for the element or any of these entries in the execution stack has an enforced value, and if so, setting the element to a sub-element identified by the entry that is associated with a highest business hierarchy level entry. Otherwise, the element can be set to a sub-element identified by a lowest business hierarchy level entry having the customized value.

Another aspect of the present invention is directed to a system that can perform the automated handling of incoming events. In general, this system, which can be implemented in one or more servers or other computing devices of a data center, can include an event preprocessor, a process determination module, a process control module, and an automation module.

In one embodiment, the event preprocessor can receive and record events from various systems of the data center and output at least some of the events to the process determination module. In turn, the process determination module may select, according to a multi-level hierarchical analysis, at least one module of a process to perform responsive to a first event, where the process is customized for a client associated with a managed system that generated the first event. In turn, the process control module can receive an indication of the selected module and obtain and populate a master controller with elements of the module. Thereafter, an automation module can receive the elements and execute at least one of them. In some embodiments, an analysis module can be coupled to the automation module by a feedback path to receive and analyze information regarding the execution.

Yet another aspect of the present invention is directed to a system that includes a process determination module to generate, for a process including various modules associated with an event, an execution stack from a process stack having for each module entries each corresponding to a business unit entity and process level. Each entry in this stack can have a value that is one of a customized value, an enforced value, or an inherited value.

In one embodiment, the process determination module may include multiple hierarchical logic units to determine actual automated operations to be performed responsive to the event. One such logic unit may generate an actual process from the execution stack according to a first hierarchical analysis that is to select for each module the entry having the enforced value and that is associated with a highest business hierarchy level if present, and otherwise select the entry having the customized value and that is associated with a lowest business hierarchy level. A second such logic unit may access the execution stack and the actual process to determine sub-elements, details for each process step, to be performed during execution of each module of the process according to a second hierarchical analysis.

In turn, a process control module, which may be coupled to the process determination module, may receive an indication of occurrence of an event and a lifecycle of the event on a client device and determine one or more modules of the process to be executed based on the event and its lifecycle, and to populate entries in one or more control queues with elements of the module(s), as determined by the first hierarchical logic unit. An automation module that includes control engines each coupled to one of the control queues can then receive entries from the associated control queues and execute the steps and their sub-elements.

BRIEF DESCRIPTION OF THE DRAWINGS

FIG. 4 is a flow diagram of generating a customized process in accordance with an embodiment of the present invention.

FIGS. 6A-6D are illustrations of a process stack in accordance with an embodiment of the present invention.

FIGS. 12A-12D are illustrations of user interfaces for a process customization module in accordance with an embodiment of the present invention.

DETAILED DESCRIPTION

In various embodiments, an event-driven process management and automation system may be provided. Such system may be particularly appropriate for a multi-tenant environment. In this way, a single process handling flow may be generated for a given process. However, because in a multi-tenant environment many different entities may desire to customize or optimize this process handling flow for their particular usage, modifications to the process flow may be easily handled. That is, rather than incurring additional development costs (e.g., developing specific code for a given entity, requiring the time of a software developer) to generate a process flow for a given entity, instead a single process handling flow for a given process may be customized using an inheritance model. In this way, a user interface that can be navigated by a non-technical user can provide for process modification without incurring additional development costs.

Thus using embodiments of the present invention, decreased development time can be realized for providing new automations due to an element-based process construction. Furthermore, using an inheritance model in accordance with an embodiment of the present invention, a process may be standardized, with focused customization available on a macro and/or micro level.

Figure 1:
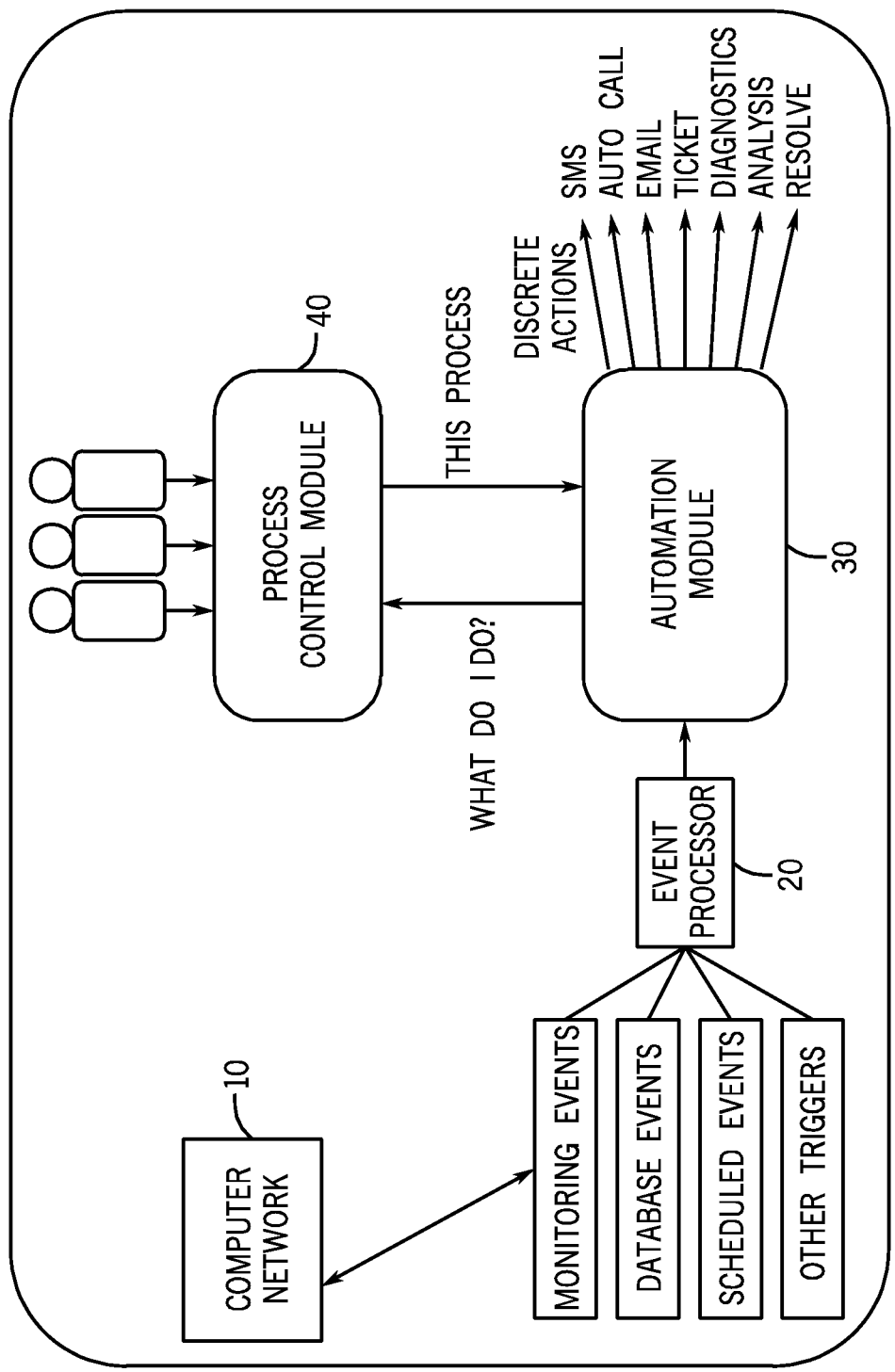
FIG. 1 is a block diagram of an automation flow in accordance with an embodiment of the present invention.

Referring now to FIG. 1, shown is a block diagram of an automation flow in accordance with an embodiment of the present invention. Note that the embodiment shown in FIG. 1 is with regard to an event handling process, e.g., for events occurring within a computer network. However, the scope of the present invention is not limited in this regard and an automation flow as described herein can be used in many other types of processes. Also, understand that the illustration of FIG. 1 is at a high level, and more or different components can be present in particular embodiments. As seen, a computer network 10, which may be a multi-tenant server farm having many different servers, e.g., tens of thousands of servers such as blade servers, interconnected storage devices and so forth, may trigger events that are provided to an event preprocessor 20. In various embodiments, event preprocessor 20 may be implemented in one or more servers to provide for receipt and initial handling of incoming events from computer network 10. In some embodiments, event preprocessor 20 may be substantially co-located with at least portions of computer network 10, although the scope of the present invention is not limited in this regard.

During both normal operation as well as responsive to failures, computer network 10 may generate various events. Many different types of events are possible. As examples, such events may include monitoring events, which report on monitoring that occurs on a given server. Other events may correspond to database events, which are events occurring when a watcher senses changes in a portion of a database, e.g., where data is stored. Still further events may be scheduled events, which correspond to routine monitoring or maintenance events that are performed on the various servers. Other events may be generic triggers such as shopping cart events or employee lifecycle events, for example. Any of these or other events may be provided to event preprocessor 20.

In various embodiments, event preprocessor 20 may parse the incoming information, which may be in the form of different message types, e.g., having different data communication protocols and including various information including header information as well as the event information. Accordingly, event preprocessor 20 may log the incoming events to maintain an independent record of the received events and preprocess the events, e.g., by filtering certain events if they are determined by the preprocessor to be not suitable for further processing. This filtering may be performed based on information in a filter database, which provides various rules for preprocessing of a given type of event.

Still referring to FIG. 1, event preprocessor 20 may thus process an event stream or provide endpoints for event submission, and provide various incoming events that have been selected for further processing to an automation module 30. As seen in the illustration of FIG. 1, various events may be provided in an event stream, which may include monitoring events, database events, scheduled events and other triggers. Automation module 30 may perform two general actions, first forwarding an incoming event to a process control module 40, and second taking an appropriate automated action, after being instructed accordingly.

As discussed further below, process control module 40 may determine a responsive action for automation module 30 to perform responsive to a given event based on various information available to process control module 40. Accordingly, responsive to an incoming event, automation module 30 may first communicate with process control module 40 to indicate the event. This indication may include information regarding the particular customer and the type of event that occurred. Then, in response to this information, process control module 40 may perform various calculations, look up different information in various databases and provide a process indicator to automation module 30. In turn, automation module 30 may perform its second general action, namely taking one or more actions responsive to the process indication.

Assume that the event is some type of monitoring event to indicate a failure or other happening occurring in a computer system of the network. The action indicated to occur by process control module 40 may be a notice that can be transmitted by automation module 30 as instructed. As seen in the example of FIG. 1, the discrete action to be taken by automation module 30 in this regard may be one or more of various communications such as a short message communication (SMS), an auto call, an e-mail, ticket generation and transmission, diagnostics, analysis, or event resolution.

With regard to process control module 40, note that various users may interact with this module. Furthermore, via a high-level user interface, non-technical users may perform such interaction. That is, rather than requiring the resources and expense of software developers, engineers or other technical individuals, non-technical users can access and customize a process response for a given customer, e.g., of the multi-tenant environment. For example, the non-technical users may be customer representatives who, based on information from a customer, can modify a standard process using an inheritance model in accordance with an embodiment of the present invention. As such, the need for advanced technical users to create a process flow for a given customer responsive to a given event can be avoided. While shown in FIG. 1 at a high level with regard to this specific arrangement, understand that in many embodiments various additional tools and modules may be present and may be in communication with each other. In addition, users may interact with different modules of the system in order to implement self control.

Figure 2:
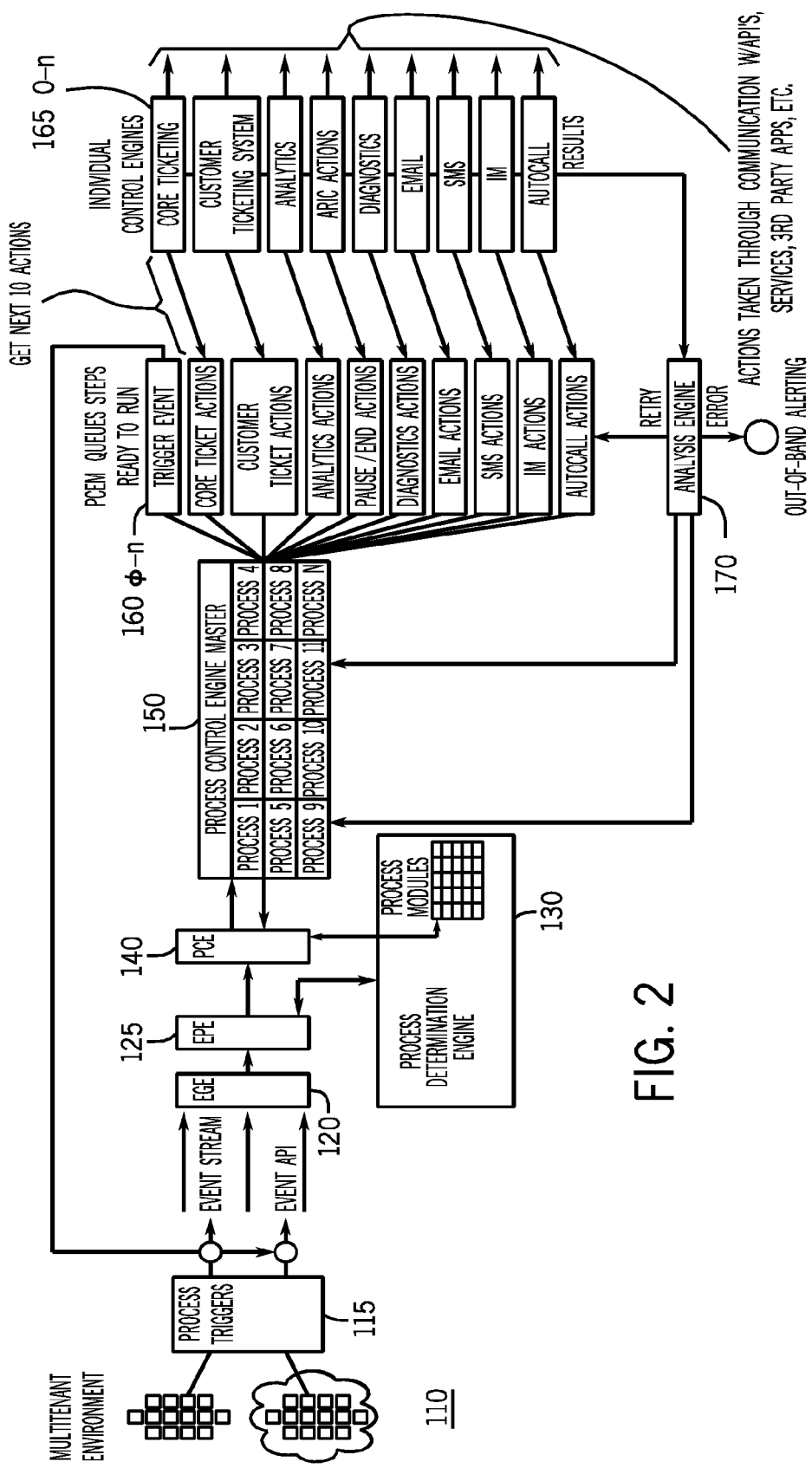
FIG. 2 is a block diagram of an overall system in accordance with another embodiment of the present invention.

Referring now to FIG. 2, shown is a block diagram of an overall system in accordance with another embodiment of the present invention. As shown in FIG. 2, system 100 may include various components that can be present in one or more locations. For example, the various modules, tools, engines and so forth shown in FIG. 2 may be part of one or more servers or other computing systems.

As seen in FIG. 2, system 100 may include a customer environment 110. The customer environment can take many different forms, and may be one or more servers of a customer, either present at a customer location or located in a multi-tenant environment. The customer environment 110 can include many different components, and in addition to the servers, data storage devices and so forth may also be present.

During operations, process triggers 115 may occur within devices of customer environment 110. These triggers may correspond to scheduled processes, database analytics, monitoring sensors, direct injection, or other such triggers such as routine reports, performance monitoring, failure information or so forth. As seen, these triggers may thus generate events that can be processed in the form of an event stream and event application programming interfaces (APIs), which can be provided to an event-to-grid-engine (EGE) 120. In various embodiments, EGE 120 may journal every event that enters the system and parse certain information from the events for journaling. While the scope of the present invention is not limited in this regard, EGE 120 may take the form of a module that can receive and handle initial processing of incoming events (such as logging or so forth). The journaling performed by EGE 120 may occur within a journal database (not shown for ease of illustration in FIG. 2).

In turn, events may be provided to an event preprocessor, e.g., in the form of an event preprocessing engine (EPE) 125. In various embodiments, EPE 125 may take the form of one or more servers at a centralized location, e.g., of a multi-tenant environment. Event preprocessor 125 may perform various handling on incoming events, including enrichment, filtering, standardization and so forth. For example, in some implementations the event preprocessor may first enrich incoming events with business and event data/lineage. Or if an event is a new event, it may register the event, e.g., in an event database to which the event preprocessor is coupled (note that this event database is not shown for ease of illustration in FIG. 2). As to filtering, the event preprocessor may check suppression business rules to verify whether the event should be processed. For example, a suppression manager, which may be part of the event preprocessor or coupled thereto, can be used to perform various filtering based on the events and other information. For example, these rule sets could include flood valves, patching suppression, business rules, duplication rules, suppressed events for offline devices and so forth to filter certain events from further processing. In addition, the suppression manager may act to filter events on a schedule determined by customers and customer representatives and scheduled through a user interface. Thus certain types of events may be filtered out and not further processed.

Also, because the events may be incoming from many different types of customer environments and systems, these events can be in different formats. Accordingly, event preprocessor 120 may handle these different event types to place them in a general standardized form for further handling.

In turn, events from event preprocessor 125 may be provided to a process determination engine (PDE) 130, which may include at least some functionality of the process control module 40 discussed above regarding FIG. 1. In general, process determination engine 130 may be configured to receive an incoming process request from EPE 125 (e.g., a Get Process request) and to calculate an execution stack for the process based on the received event. This execution stack may be calculated from information present in a process stack that includes a matrix of all possible processes that can be performed. As discussed further below, this process stack may be organized by process module and business unit hierarchy (with each business unit hierarchy having multiple process layers associated therewith). The resulting execution stack may correspond to a list of possible process modules to be executed responsive to a received event.

This execution stack can then be refined to thus generate a list of actual process modules to be executed that may be stored in a process action matrix. As will be discussed, this list may be determined based on an inheritance model in accordance with an embodiment of the present invention. This list of process modules to be executed, however, alone is insufficient to provide full details for execution of the selected modules. Instead, in various embodiments from this list of process modules, another inheritance model in accordance with an embodiment of the present invention may be run to thus generate details of the actual steps to be performed in each process module selected for execution. This list of actual steps and their details to be performed may be stored in a process action elements table which can later be accessed by a process control engine 140 to obtain the actual steps for execution.

Accordingly, process determination module 130 may provide a list of process modules back to EPE 125. In turn, EPE 125 may communicate this list of process modules to a process control engine (PCE) 140. In general, process control engine 140 may determine a lifecycle of the event associated with the selected process modules based on parameters defined in process determination engine 130. That is, PCE 140 may communicate with process determination engine 130 to determine the lifecycle based on parameters including ticket reporting options, recurrence settings or other such settings, such as whether the event is a first event, a subsequent event, a cleared event or so forth.

Still further, in one embodiment PCE 140 may then perform a final suppression check which, in one embodiment may be based on business & suppression rules in EPE 125. Thus based on all of these determinations and the suppression check, PCE 140 may identify one or more process modules that are to be executed based on the type/lifecycle of the event and so forth. PCE 140 may thus prepare the modules for execution, flag the first step to be executed and provide them to a process control engine master 150.

In various embodiments, process control engine master 150 may operate to store a list of steps to be performed for each module and to identify an initial step that is ready for execution. In addition as will be discussed further below, process control engine master 150 may be coupled to receive status information regarding execution of process steps and take appropriate action to prepare new or different steps for execution.

When a given process module step is ready for execution, as indicated by a set ready flag, the step may be sent to an appropriate queue. That is, process control engine master 150 may be coupled to a set of queues $160_0$-$160_n$ each to store entries corresponding to process steps to be performed by a given control engine. Accordingly, process control engine master 150 may identify the type of steps to be performed and provide it to the appropriate queue for storage until it is ready to be executed by the corresponding control engine. To that end, system 100 may further include a plurality of individual control engines $165_0$-$165_n$ which may collectively form an automation module. Each such control engine 165 may be configured to perform one or more given types of process steps. Note that each control engine may group consecutive like process steps. In addition, the engines may swap out and write variables back to databases or so forth depending on steps. In some embodiments, the engines may be configured to receive a batch of actions from the corresponding queue 160. For example, in one embodiment the engines may be configured to receive a set of 10 actions to be performed.

Accordingly, control engines 165 may execute various steps for its associated type of action. As seen in the embodiment of FIG. 2, these different control engines may perform different tasks including, for example, internal ticketing, customer ticketing, analytics, process determination actions, diagnostics, e-mail messaging, SMS messaging, instant messaging, auto-call messaging, or other actions. Note that the various actions taken by these different control engines may be implemented via communication with APIs, services, third-party applications and so forth.

When a given action performed by one of the control engines has completed, either successfully or unsuccessfully, results may be provided to an analysis engine 170. In various environments, analysis engine 170 may analyze the status/results of the action performed. Different settings may determine whether the step was successfully performed, needs to be retried, results in jumping to a different module in the process, or triggering an out of band alert, e.g., on an error.

That is, it is possible that a given process step that is executed does not successfully complete. Accordingly, in this situation, analysis engine 170 may communicate via an out of band channel to provide an alert on the error. Note that in some embodiments, a failing process step may be executed a threshold number of times to attempt successful execution prior to raising an error and issuing an out of band alert. With this out of band channel, embodiments thus may provide information regarding the failure so that the automated process handling does not lose an event and corresponding process handling.

Further with regard to analysis engine 170, when a process has successfully completed, a message may be sent to process control engine master 150 to update a given process module accordingly. For example, the completed step may have its status updated to completed, and a next step in the process module may be flagged as being ready for execution. If instead, analysis engine 170 determines that a jump to a new module is indicated responsive to either success or failure of a given step of one module, an appropriate update message can be sent to process control engine master 150. For example, when jumping to a new module the message may instruct the master to close the last completed step of the old module as completed and cancel all remaining steps in that module and update the new module with its identified steps and flag the first step of this new module as ready for execution. While shown with this particular implementation in the embodiment of FIG. 2, understand the scope of the present invention is not limited in this regard.

To further understand how process automation in accordance with an embodiment of the present invention occurs, it is instructive to consider the arrangement of hierarchies of business units and processes. As discussed above, embodiments are particularly suited to enable a non-technical user to customize a selected process for a given customer. In other words, a baseline set of processes may be present in the system and for any given customer, various components of a given process can be automated to handle the event as desired by the particular customer. Accordingly, embodiments may provide customization for subsets of customers/devices/events, or even specific customer/events devices/events. This customization can be realized in the handling of various automated process steps itself, and ticket handling or other reporting events.

Baseline processes may be set in the system as determined by a process manager. This process manager may correspond to a highest level entity of a business unit structure for which its process is associated. For example, in a multi-tenant environment, different business unit structures may be present, e.g., for different customers or groups of customers. In yet other embodiments, a single business unit structure may be present, with additional levels within a business unit structure to be added or deleted over time. That is, embodiments may provide for a dynamic hierarchical structure with regard to business units.

Figure 3:
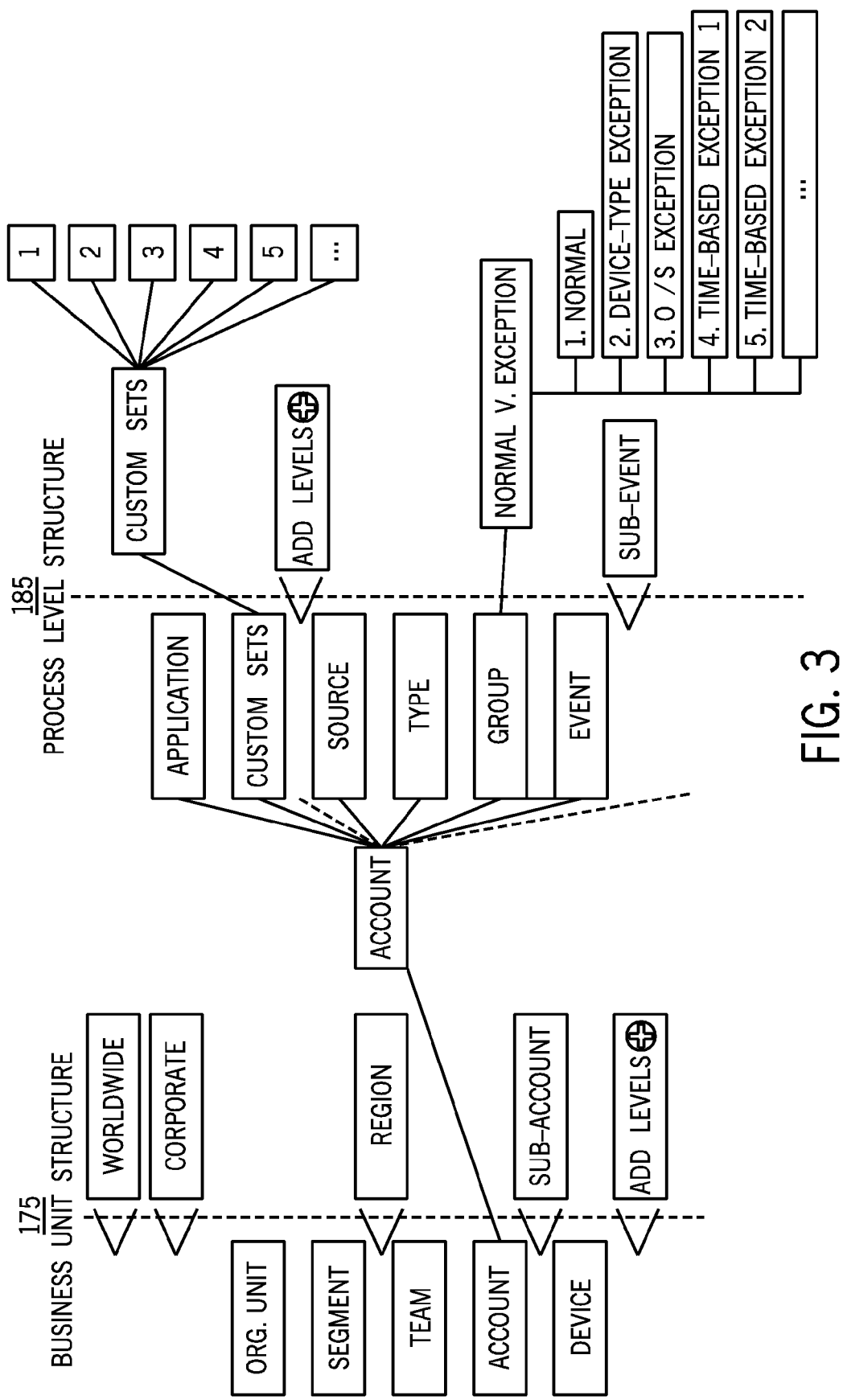
FIG. 3 includes hierarchical diagrams of business unit and process level hierarchies in accordance with one embodiment of the present invention.

Referring now to FIG. 3, shown is a hierarchical diagram of business unit structures and process level structures in accordance with an embodiment of the present invention. As shown in FIG. 3, a business unit structure 175 is provided that may include various hierarchical levels. As seen, these hierarchical levels may include an organization unit, segment, team, account and device.

Additional hierarchy levels may dynamically be added over time. For example, as a business evolves, a business unit structure hierarchy may evolve to include new business layers for process management. Thus as seen, additional hierarchy levels, including worldwide, corporate, region, sub-account and other levels can be dynamically added. Note also that in different embodiments, the active business units (e.g., those hierarchy levels on the left side of business unit structure 175) may have labels that can change depending on the environment in which processes are being managed.

As further illustrated in FIG. 3, a process level structure 185 may also be present. This process level structure provides a hierarchy for processes that can be performed for a given business hierarchy level entity. Similar to the business unit structure, process level structure 185 may be dynamic and can include active process levels, which provide a lineage that any event and/or process trigger may have. Depending on process needs, individual event sources can consider all or some of the process hierarchy levels. Further, dynamic process levels may be added over time, e.g., as a business evolves, process levels may change to provide additional flexibility in process management. Note that each process level may be available for use at every business unit hierarchy level within the business unit structure, unless the business decides to restrict what levels are available at a given business unit level.

As seen in the embodiment of FIG. 3, process level structure 185 may include a plurality of active process levels, including application, custom sets, source, type, group, and events. Note further that the custom sets of the process hierarchy level may allow a single process to be associated with multiple events/groups/types/sources/applications/devices and may potentially apply to other process levels of business units. Note that in various embodiments there can be multiple custom sets for a single device, which can be stacked by rank and which may be modified, e.g., via a user interface.

As further seen in FIG. 3, each layer in the process level hierarchy may provide an illustration that at every process level, specific exceptions can be defined. As seen in the specific illustration of FIG. 3, these specific exceptions may include a device type exception, OS exception, and one or more time-based exceptions. Note that these exceptions may be inserted within the hierarchy after a normal process, and these exceptions may be stacked by rank. These exceptions can also be dynamically added as business evolves.

Note that the above discussion with regard to customization of a process is with reference to the operations performed by a process customization module in accordance with an embodiment of the present invention. To further understand how the customization process can be implemented by a non-technical user, it is instructive to look at an example customization for a sample process.

For ease of illustration, discussion is with reference to a process for executing a brunch, which consists of three different modules, namely an invitation module, an execution module, and a closing module. As seen in the illustration of FIG. 4, there are various business unit hierarchies, namely a highest level hierarchy corresponding to a corporate level and for which a standard process is identified, a segment level and an account level. For each module, it may be possible to have a customization of the operations to be performed in the different modules for each user (of a given level). As seen for the corporate level hierarchy, a specific set of operations are set forth for each of the process modules. With regard to the segment unit, some of the operations performed can be customized, meaning that the operation(s) can be in variance from the operation(s) for the corresponding module according to the standard process operation(s) (e.g., the invitation module is different in the segment level than in the corporate level). Further, for the segment unit some operations are inherited, meaning that the selection of the process by the higher level hierarchy is passed to the lower level hierarchy. Specifically, as seen with regard to the second module, namely execution, the segment inherits the operations selected by the corporate level hierarchy. Finally, with regard to the last module, namely the closing, the segment hierarchy may choose a different operation (such that it is customized) and have that operation enforced, meaning that members of all hierarchies below that level must perform the same operation. Thus, table entry A shows execution of a customized process by the segment level entity.

As seen in FIG. 4 with regard to a lower level hierarchy member, namely at an account level, a different or customized process can occur for the invitation module, while the entity chooses to inherit the same operations as the segment level as for the higher level for the execution module, and is enforced to perform the same operations as the segment level for the closing module. Thus as seen further in FIG. 4, for an account hierarchy entity, the specific operations shown in table entry B are performed.

Accordingly, for different operations performed in various modules of a process, some of the elements can be customized elements, where the operations performed can be customized at any level of a business hierarchy. Yet other elements can be inherited elements, in which no customization is made, and the operations to be performed are inherited from a higher level in the business unit hierarchy and changes inherited. Still further, other elements can be enforced, such that the element itself may be customized for a particular business unit hierarchy, but from that hierarchy on down, the element is enforced to be operated as indicated.

Figure 5:
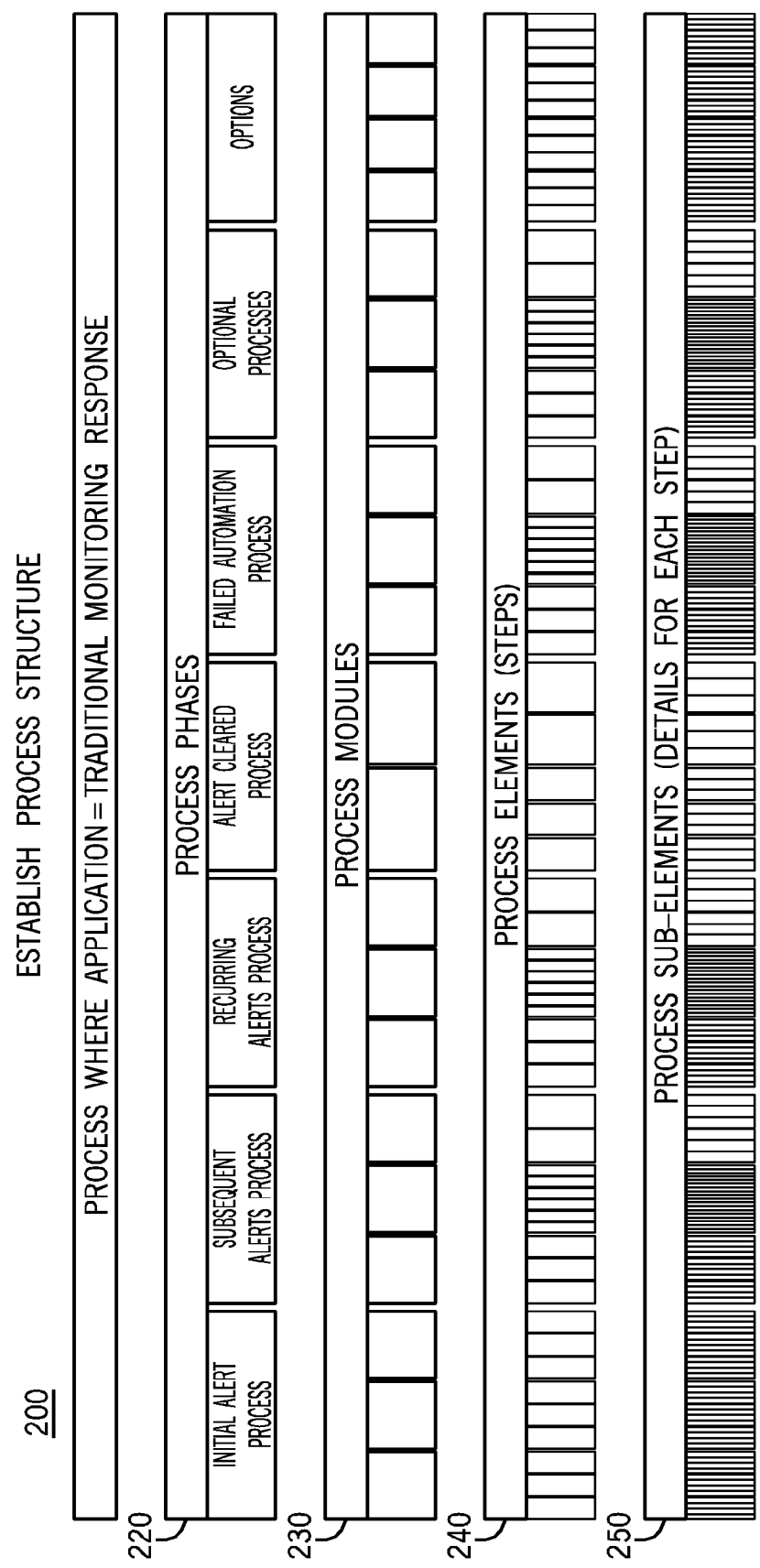
FIG. 5 is an illustration of a process structure in accordance with an embodiment of the present invention.

To understand more specifically how process customization in accordance with an embodiment of the present invention can work, it is instructive to understand various elements of a process and how they interact with the business level and process layer hierarchies. Referring now to FIG. 5, shown is an illustration of a process structure in accordance with an embodiment of the present invention. As shown in FIG. 5, process structure 200 may include a plurality of hierarchies from the process level, which may be an identification of the process itself, namely a complex set of operations to be performed, e.g., responsive to a given event. For purposes of discussion, an example process in the context of an incident response is described. As discussed, each process may be associated with a specific event, type of event or so forth. Process 200 includes a plurality of process hierarchy levels including a process phase level 220, a process module level 230, a process element level 240, and a process sub-element level 250. In general, the module level and lower levels can be customized, while the phase level may provide for visualization of an overall layout of a given process.

As seen in FIG. 5, in the particular embodiment of an incident response process, process phases may include an initial alert phase, subsequent alerts phase, recurring alerts phase, alert cleared phase, failed automation phase, optional phase, and options phase, and can grow. As seen further in the hierarchy of FIG. 5, one or more modules 230 may be associated with each process phase. Specifically, the initial alert phase may include an initial messaging module, a corrective actions module, and a closing actions module. Similar and different modules may be present and associated with each of the other phases of the process. In turn, each module may be broken up into individual process elements 240, corresponding to specific steps that are to be performed within the module. For example, the initial messaging module of the initial alert process may include a send e-mail step, a send SMS step, and create an internal ticket step. Note further that each process element or step may be further subdivided into multiple process sub-elements 250, which may provide detailed operations for each step. While shown with this particular illustration in the embodiment of FIG. 5, understand the scope of the present invention is not limited in this regard.

Figure 6B:
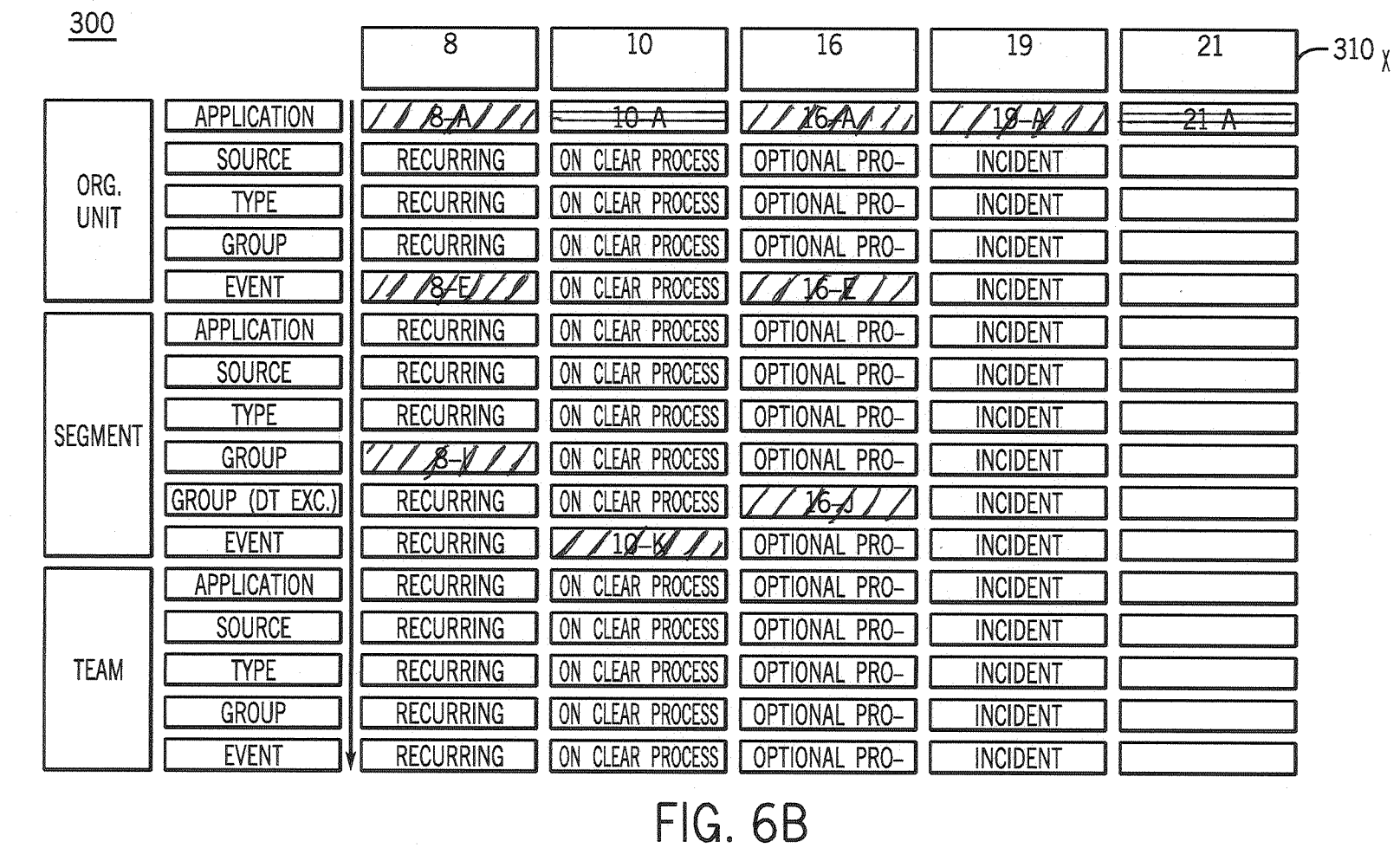
Figure 6D:
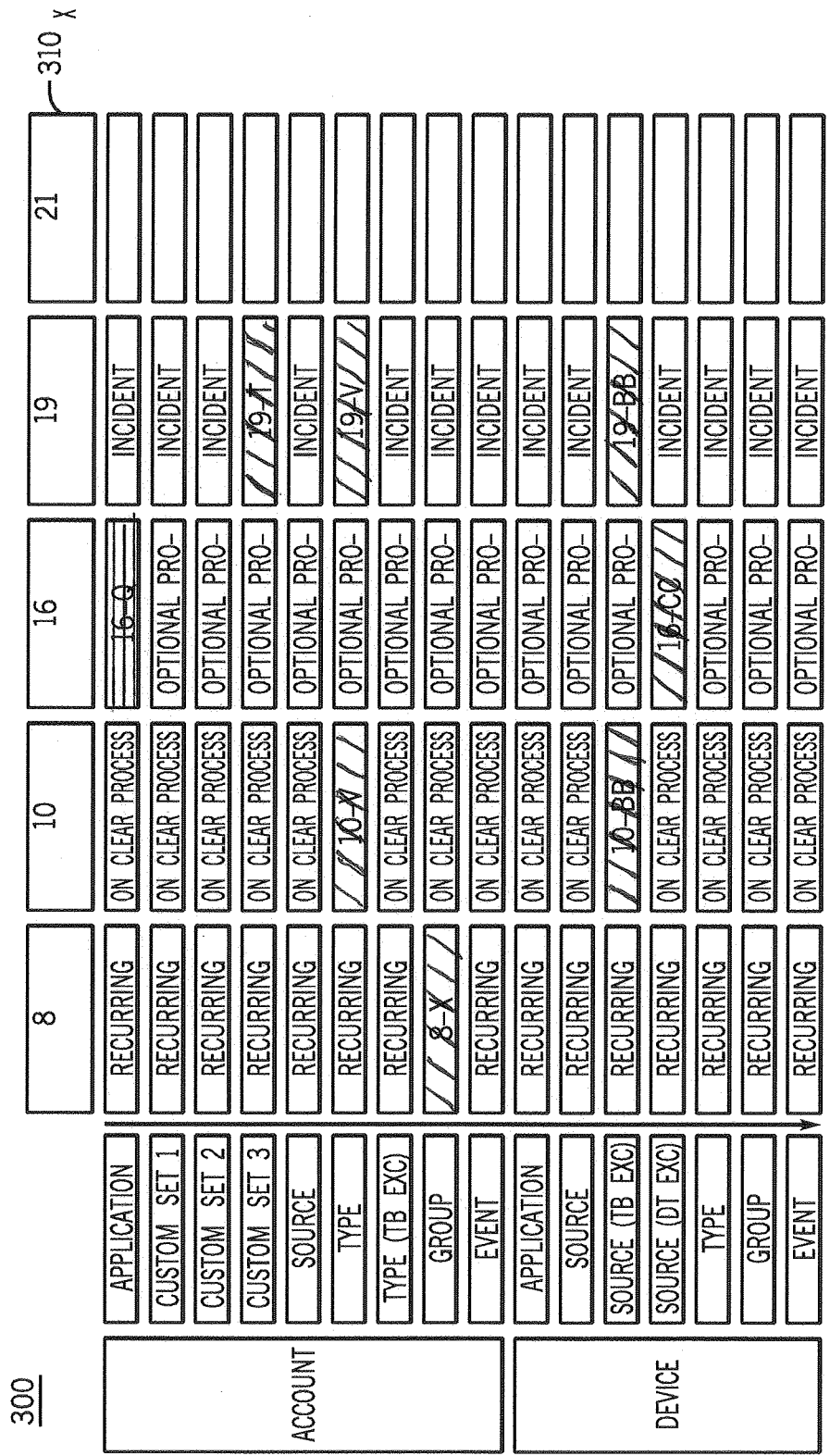

As a further aid in understanding how various process modules, steps thereof and so forth can be identified responsive to receipt of a given event, it is instructive to understand the organization of possible operations available to be performed for a process. Referring now to FIGS. 6A-6D, shown are illustrations of a process stack in accordance with an embodiment of the present invention. As shown in FIGS. 6A-6 D, process stack 300 may be formed as a matrix or array of entries each corresponding to an identification of a module of a process, as selected by each different business unit hierarchy level. In turn, each business unit hierarchy level may include a full process layer hierarchy. Note that while shown at the module level in FIGS. 6A-6D, in some embodiments, each entry within the matrix may include information for sub-module levels, including which elements are defined in a module, and may be defined at the sub-element level. As specifically shown in FIGS. 6A-6D, process stack 300 includes a plurality of process modules 3101 -310x. For ease of illustration only a few modules are shown with entries in the process stack. All of these process modules combined may collectively form a full process. However, only certain modules may be performed responsive to a given event.

As discussed above, each module entry for a given business unit hierarchy level can have one of an inherited, customized or enforced value. In addition, the information present in each entry may include pointers or unique identifiers to locations of additional information for the corresponding module, such as location of instructions regarding the elements or steps to be performed in the module. In the specific illustrations of FIGS. 6A-6D, these module entries that are identified by a general description may correspond to an inherited value, while those having vertical crosshatching may be customized modules, and in turn those having horizontal crosshatching may correspond to enforced modules. Note that the specific process module definition possible for a given one of the process modules may be set by each business unit and each level within the process layer hierarchy. For example, with reference to an organization unit 320, five process layer hierarchies may be present. More specifically, an application, sets, source, type, group, and event levels may be provided, as well as exceptions at any level. Each of these different levels may have a given process module value associated with it. In the specific illustrations of FIGS. 6A-6D, the application level value is set at customized, the source level value is set at enforced, and the remaining levels, namely type, group and events are set at inherited. Similar other values shown in the illustrations of FIGS. 6A-6D may be set as desired by a given customer.

Figure 7A:
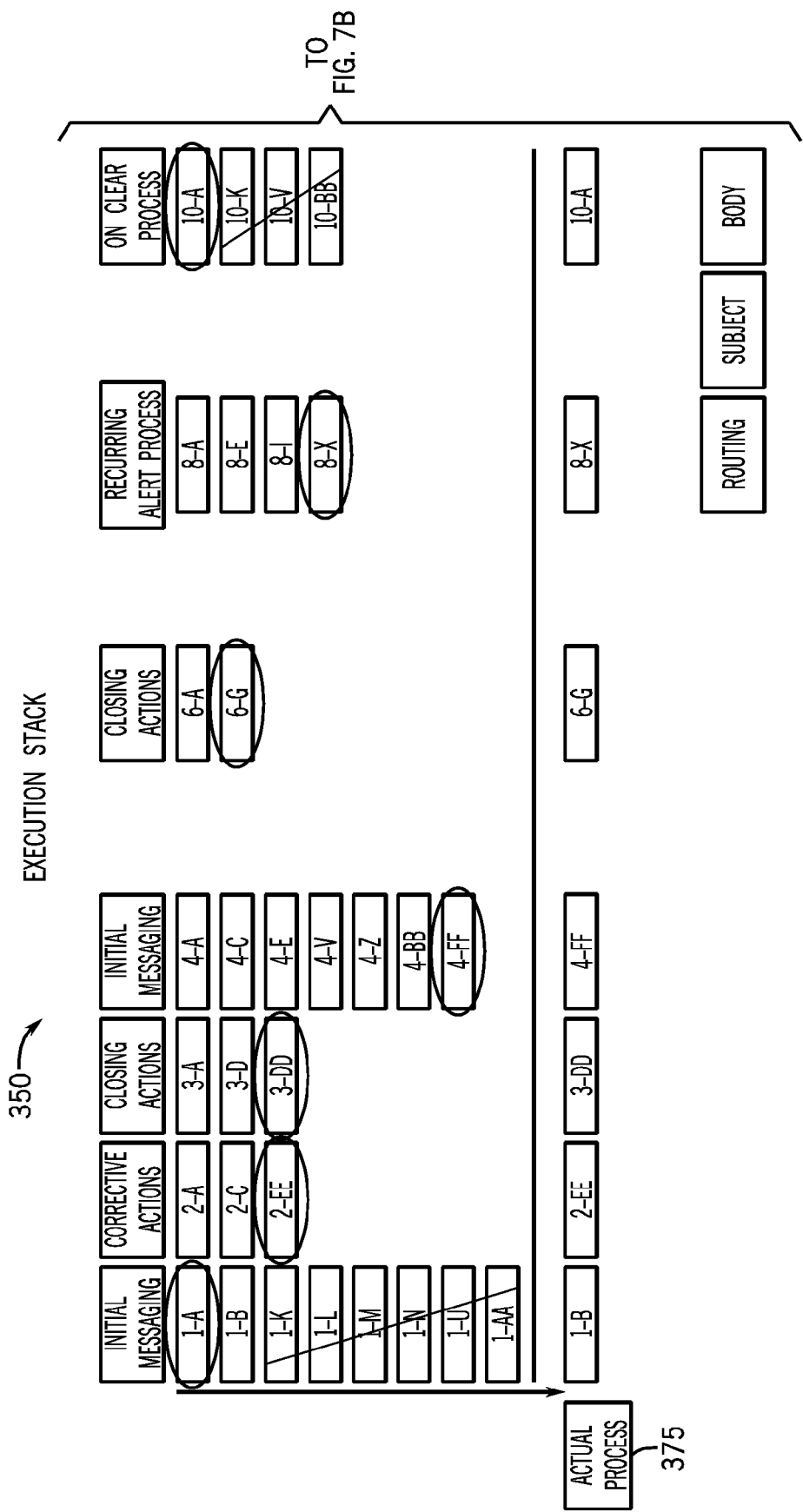
FIGS. 7A-7B are illustrations of an execution stack that results from accessing the process stack of FIGS. 6A-6D.
Figure 7B:
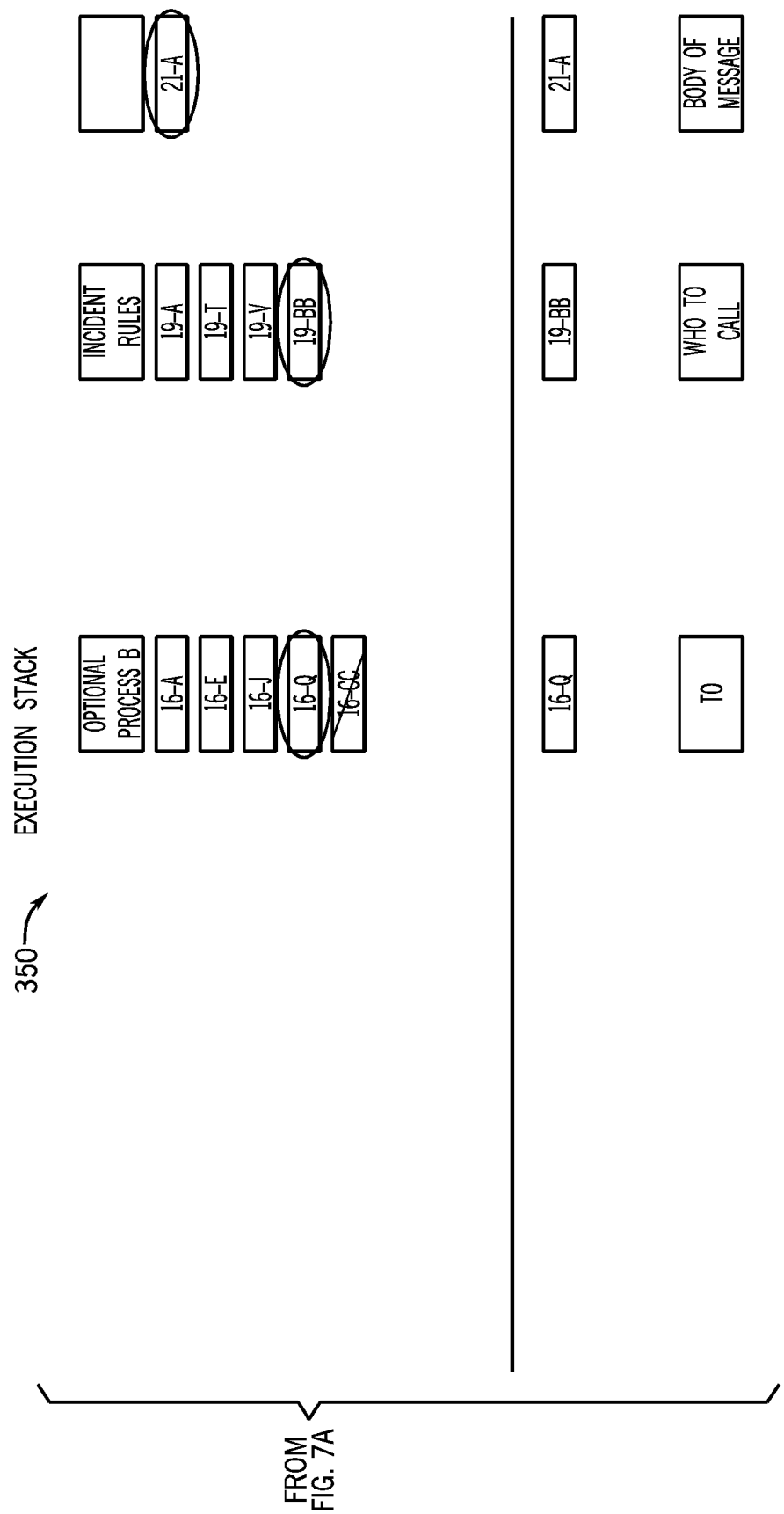

This process stack may be calculated at run-time responsive to receipt of an event to determine what process modules are to be executed. To determine given process modules to be executed, a first level of inheritance analysis may be performed. More specifically, a Get Process operation may be requested, e.g., by an event preprocessor responsive to receipt of an event to determine all possible process modules that can be executed for the given event. Referring now to FIGS. 7A-7B, shown is an execution stack that results from accessing the process stack of FIGS. 6A-6D. More specifically, all matches corresponding to either the customized value or the enforced value for each of the modules may be obtained to form an execution stack for the process. As seen, this execution stack 350 thus populates for each module a list of values from the process stack in hierarchical order that have a value of customized or enforced.

Then from this execution stack, an actual process 375 may be calculated. More specifically, this actual process 375 may be obtained via a first level inheritance calculation. This first level inheritance calculation may be realized in two manners. First, an enforcement analysis may be performed that follows the business unit hierarchy in a top-down manner such that a highest level business hierarchy level having an enforced value may be selected as the appropriate process module entry for the execution stack for the given module. If instead no business level entries exist having an enforced value for the module, then a natural selection that follows the reverse business leveling tree may be performed such that a bottom-up selection occurs so that the entry corresponding to the lowest business level hierarchy entity having a customized value is selected.

Accordingly, each module entry of the actual process 375 determines the steps to be performed and results from the identification of either the entry of the highest business level hierarchy entity having an enforced value, or the entry of the lowest business level hierarchy entity having a customized value (where the corresponding module does not have any business unit entry having an enforced value). Thus the actual process 375 provides an indication of which process modules will be used, establishing the structure of that module. For example, with reference to the initial messaging module of actual process 375 entry 1-B is selected and can be used to later determine what elements will be followed for that module. Thus while this actual process thus identifies the modules that are to be executed according to a waterfall hierarchy, the specific attributes that are defined for each step within these modules is still not known. In other words, the modules determine the steps (elements) to be performed, while the attributes (sub-elements) have yet to be determined.

Figure 8A:
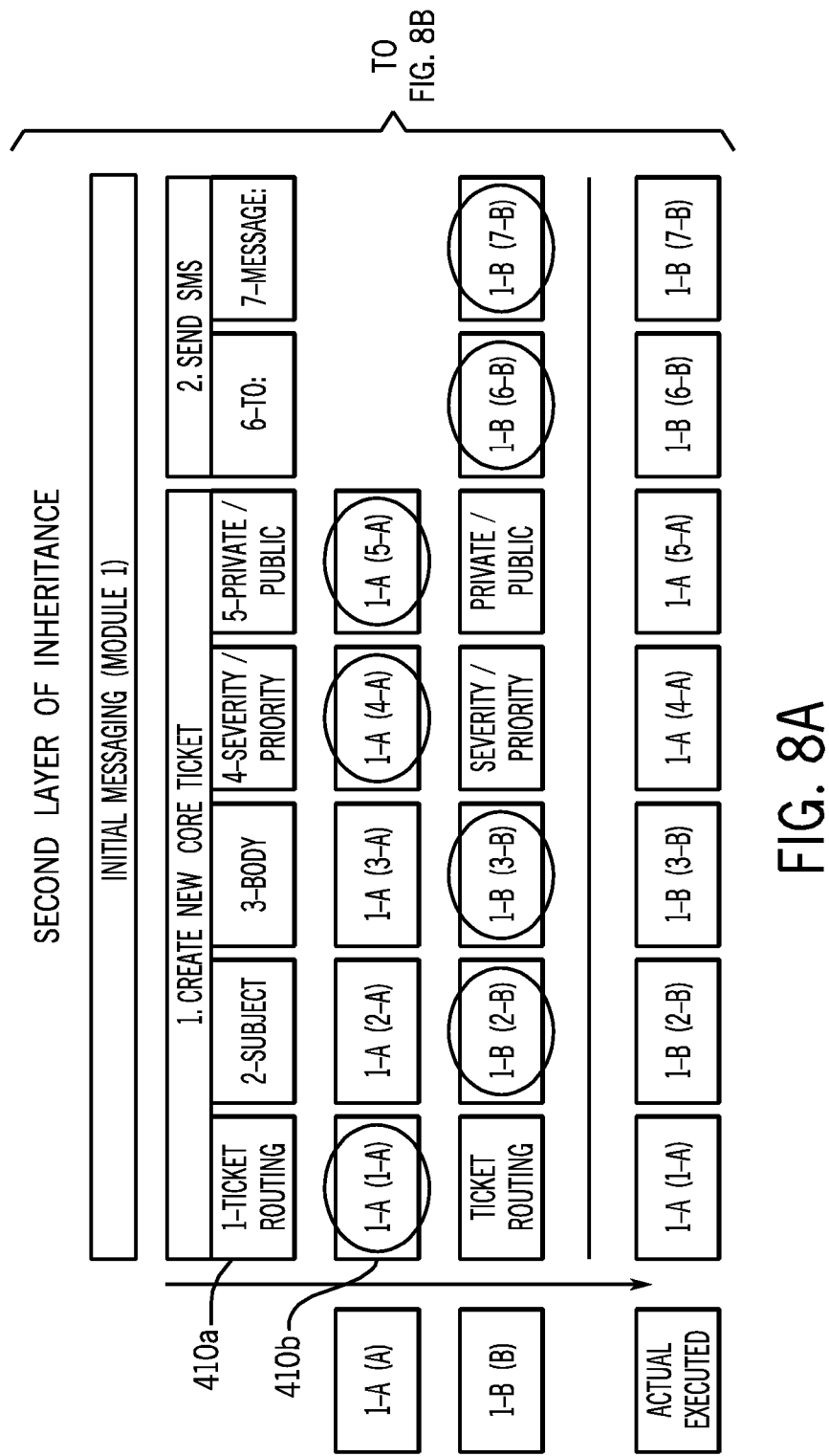
FIGS. 8A-8B are illustrations of a diagram illustrating a second level of hierarchical analysis in accordance with one embodiment of the present invention.
Figure 8B:
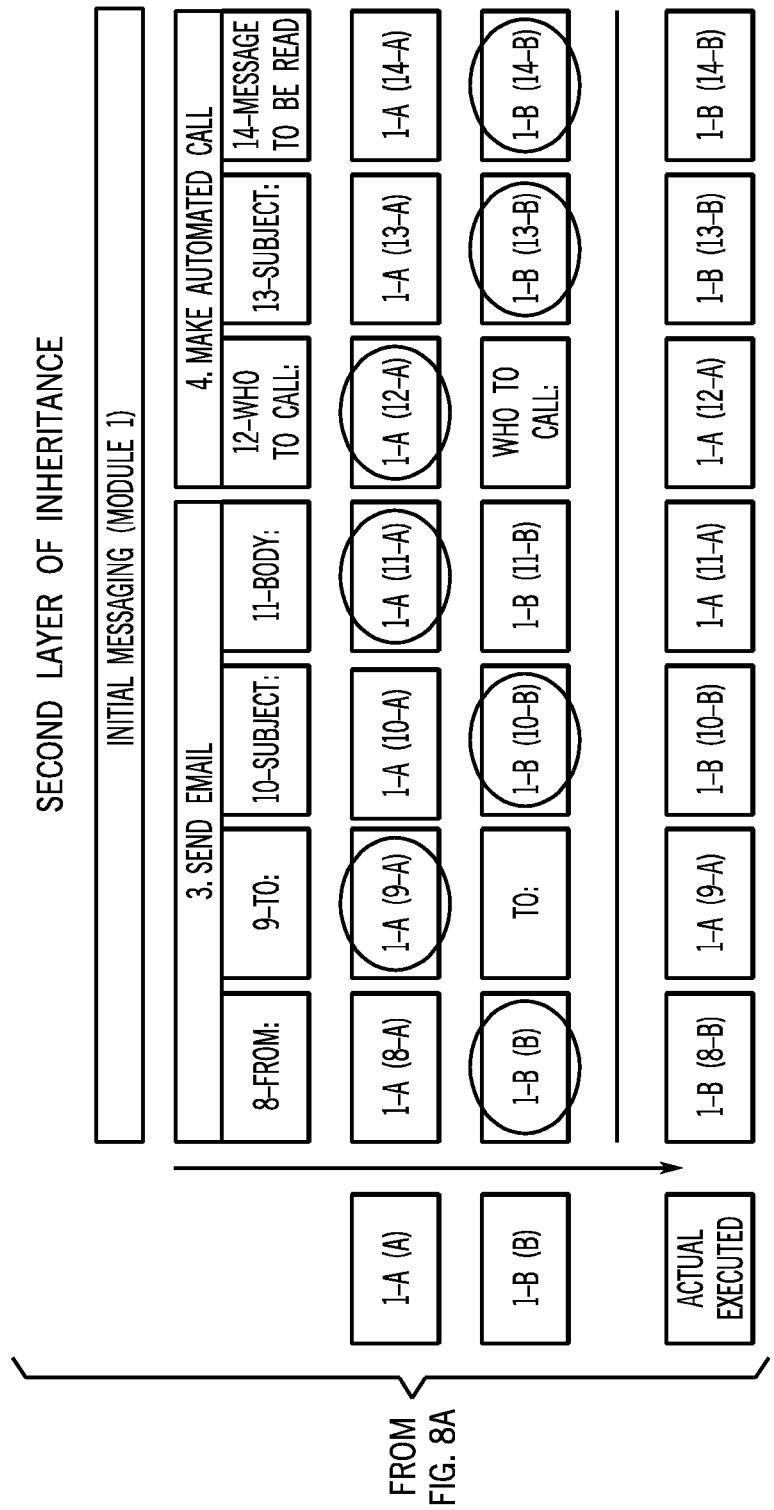

Instead to identify the attributes for each step, a second layer of inheritance analysis may be performed. The second layer of analysis may operate in the same manner as the first layer of inheritance analysis. That is, to determine actual process sub-elements to be performed for a given module, information from the execution stack may be accessed and an inheritance analysis in accordance with an embodiment of the present invention can be performed. Referring now to FIGS. 8A-8B, shown is an illustration of operation of a second layer inheritance analysis on a single module, namely an initial messaging module, to thus realize the actual sub-elements or steps of the process that are to be executed for each step of the module. As seen, this example for initial messaging module 400 includes four elements or steps 410.sub.a-410.sub.d. Each module may include anywhere from 0-n number of process steps (elements). Each step 410 is itself formed of multiple process sub-elements 420. Specifically, for process step 410.sub.0, namely create a new internal ticket, five sub-elements 420.sub.0-420.sub.5 are present. To determine the actual operations to be performed for each of these sub-elements, reference may again be made to the actual process and the execution stack. Specifically, with reference back to FIGS. 7A-7B the execution stack entry selected as part of the full process list 375, for this module was entry 1-B. Also, because this module was at an enforced value, it is also appropriate to analyze additional entries of the execution stack. Namely, one or more customized values for business hierarchy levels higher than the enforced level may also be obtained and analyzed. Thus as seen in FIGS. 8A-8B, an entry 1-A having a customized value for a higher level business hierarchy may also be obtained. From the possible process entry selections, the inheritance analysis may be performed as discussed above. That is, if for a given column of the sub-element execution stack one or more enforced values are present, the highest hierarchy level enforced value operation may be set for the actual executed operation. Otherwise, if there are no enforced values present in a given stack column, the lowest entry having a customized value is identified in the operation indicated for this entry can be set for the actual executed operation. Each process step (Element) will only work through the second layer of inheritance where the step has an identical identification number. For example, the aforementioned "create a new internal ticket" element was inherited and shares a unique identification number for second-layer inheritance; whereas, if you were to delete that step in the process and re-add the same element as a wholly new step, it would get a new unique identifier and would no longer inherit from the step above it.

Figure 9:
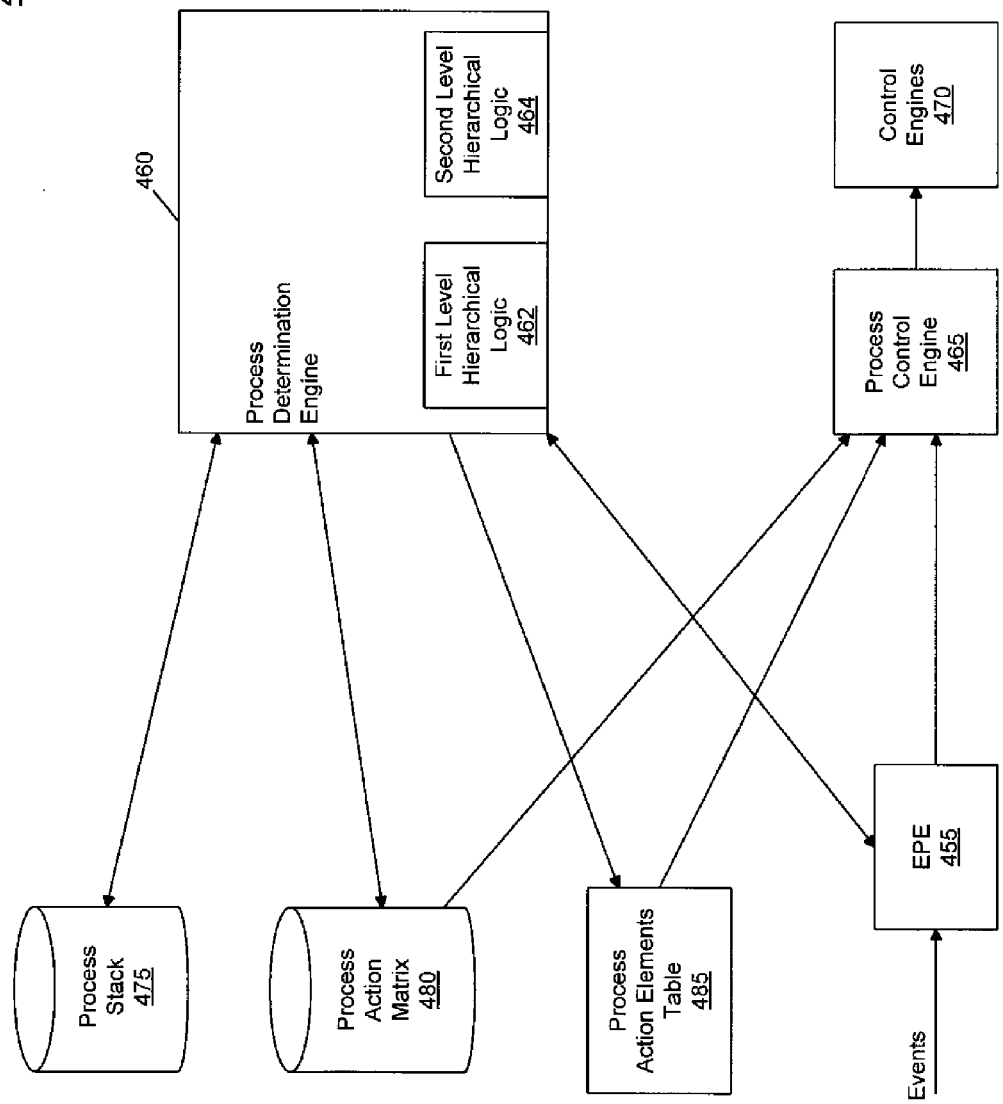
FIG. 9 is a block diagram of a system for handling incoming events using process automation in accordance with an embodiment of the present invention.

Referring now to FIG. 9, shown is a block diagram that illustrates interaction between various modules present in a system in accordance with an embodiment of the present invention. As shown in FIG. 9, system 450 includes various databases or stacks that can provide information to various modules, and a pipeline along which events flow from receipt in the system to execution of one or more process steps for the event. In addition, system 450 may include various components, some of which may be implemented via dedicated servers, others of which may be coupled to the various components, e.g., by way of network interfaces or so forth.

As to the pipeline along which events flow, as seen in FIG. 9, incoming events, e.g., received from one or more client devices of a multi-tenant environment may be provided to an event preprocessor 455 for event processing. Responsive to a received event, the event preprocessor may seek a determination of particular customized process elements to be performed via a process determination engine 460. When a given process is set, event preprocessor may provide an indication of corresponding modules to be performed to a process control engine 465, which may be in communication with various databases to provide for identification of actual operations to be performed. From this information, process control engine 465 may direct the particular operations to a given one of multiple control engines 470 for execution of the specific operations.

With regard to process determination engine 460, as seen in the embodiment of FIG. 9 it may include various logic, including a first level hierarchy logic 462 and a second level hierarchy logic 464. Of course additional logic may be present in the process determination engine 460 such as a process customization engine (not shown in FIG. 9). When information regarding an incoming event is received in process determination engine 460, first logic 462 may execute to determine a set of modules, i.e., an execution stack, corresponding to a customized process to be performed responsive to the event. This determination may be made based on information present in a process stack 475. Accordingly, from this information first logic 462 may generate an execution stack and from this execution stack a first level of hierarchical analysis may be performed to determine specific modules to be performed, which can be stored as an entry corresponding to an actual process in a process action matrix 480.

Then based on additional information regarding the event, such as a lifecycle of the event, second logic 464 may access the particular modules from the actual process relevant to the lifecycle stage and furthermore access the execution stack to perform a second level of hierarchical analysis to thus determine the actual details (sub-elements) of process operations to be performed in the identified modules. This information may be stored in a process action elements table 485. Note that the various databases shown in FIG. 9 including process action matrix 480 and process action elements table 485 may act as reference tables, which only include pointers to other data structures that include full information such as the particular operations to be performed. Accordingly, to enable process control engine 465 to access the actual detailed information regarding elements to be performed, a translation engine (not shown for ease of illustration in FIG. 9) may be present to thus translate these pointer references into actual instruction execution streams. Although shown with this particular implementation in the embodiment of FIG. 9, understand the scope of the present invention is not limited in this regard.

Figure 10:
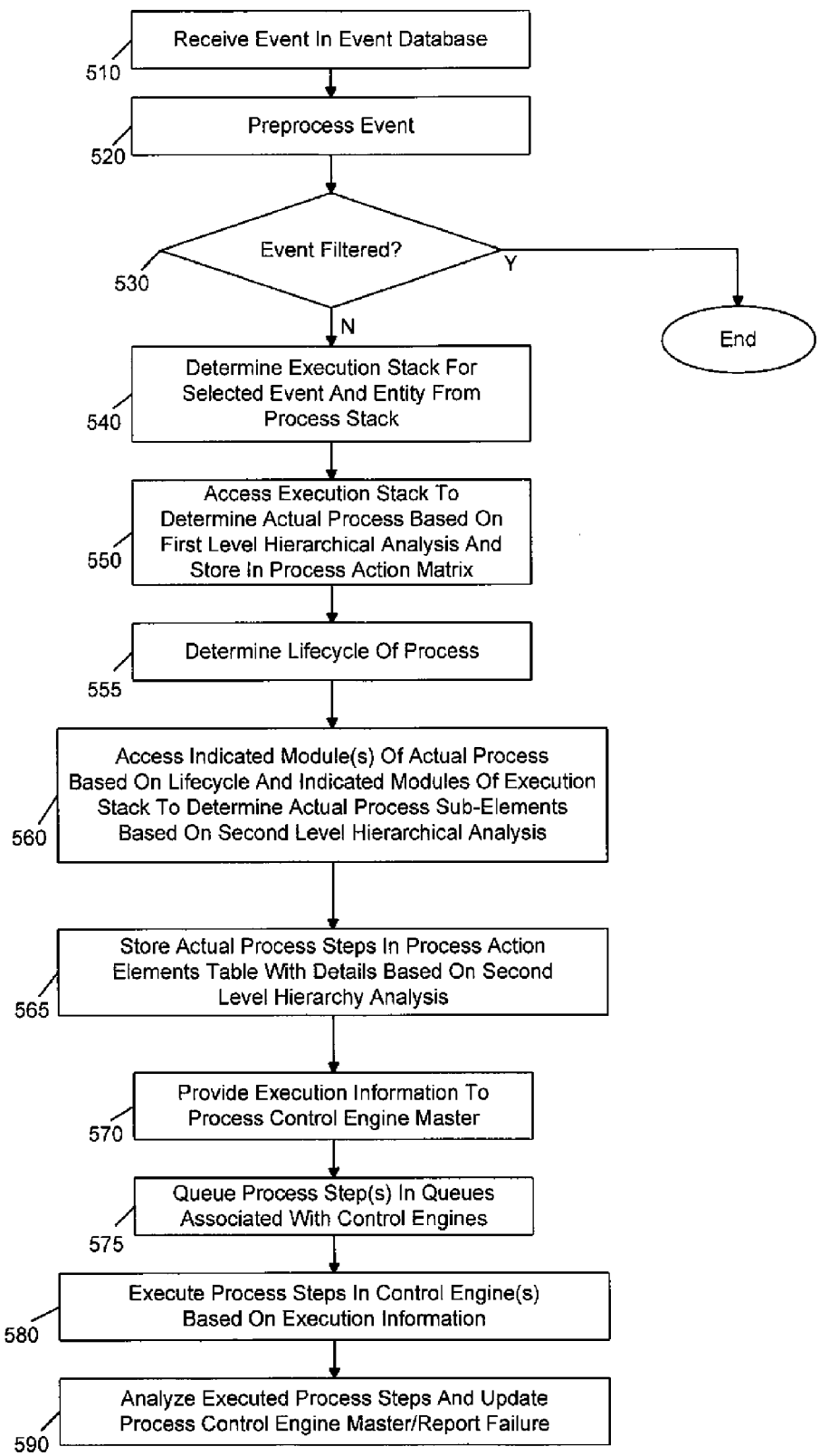
FIG. 10 is a flow diagram of a method for handling an event according to one embodiment of the present invention.

With the above discussion regarding customization of processes, it is instructive now to consider how a customized process can be executed responsive to an associated event received in a process automation system in accordance with an embodiment of the present invention. Referring now to FIG. 10, shown is a flow diagram of a method for handling a customized process responsive to an event. As seen, method 500 may begin by receiving an event in an event database (block 510). As discussed above, this event database may be located in various places, and in general may be a storage that is accessible to other portions of the process control system, including an event preprocessor.

Accordingly, as seen in FIG. 10 control passes to block 520 where the event may be preprocessed. This preprocessing may thus take the event and place it into an appropriate form for handling by the remaining portions of the process control system. Next it may be determined at diamond 530 whether the event is filtered. If so, the method for handling this event may conclude. Otherwise, control passes to block 540. At block 540 an execution stack may be determined for the selected event and entity. More specifically, based on the particular customer (e.g., identity and business hierarchy level) and event, a full process stack for the corresponding event and entity can be accessed and from that information, an execution stack may be determined. Specifically, this execution stack may correspond to, for each module of the process, a list of all entries of the process stack that have a value of customized or enforced.

As further seen in FIG. 10, control passes to block 550, where a first level hierarchical analysis may be performed to thus determine an actual process, where each module may have a single entry identified for it in the actual process. Then control passes to block 555, where a lifecycle of the process may be determined. This lifecycle determination may be based on, e.g., information obtained with the event such as type of event and number of occurrences of the event or so forth. Control then passes to block 560, where one or more indicated modules of the actual process stack may be accessed based on the lifecycle. Furthermore, these indicated modules may also have their entries within the execution stack accessed such that from these available entries, the actual process steps to be performed within the indicated modules can be determined and then their details (sub-elements) can be determined based on a second level hierarchical analysis (block 560). These actual process steps and their details that are thus determined by this hierarchical analysis may be stored in a process action elements table (block 565).

Control then passes to block 570, where execution information may be provided to a process control engine master. For example, in one embodiment actual process steps present in the process action elements table may be used to access a storage that includes the particular instructions to be performed for each of the indicated process elements or sub-elements. This information may thus enable queuing of process steps in various queues associated with different control engines (block 575).

Accordingly, control passes to block 580 where process steps may be executed in one or more control engines based on this execution information. Furthermore, responsive to the execution, various analyses may be performed, e.g., in an analysis module, so that the process control engine master may be updated based on success or failure of particular process steps (block 590). Furthermore, if an error is indicated, an out of band failure report may be generated and forwarded. While shown with this particular implementation in the embodiment of FIG. 10, understand the scope of the present invention is not limited in this regard.

As described above, processes can be customized for various customers. Note that because of the capabilities of a process control module to handle automated processes and further by way of a hierarchical inheritance model in accordance with an embodiment of the present invention, a non-technical user such as an account representative for a customer or the customer itself can easily and efficiently customize a given process.

Figure 11:
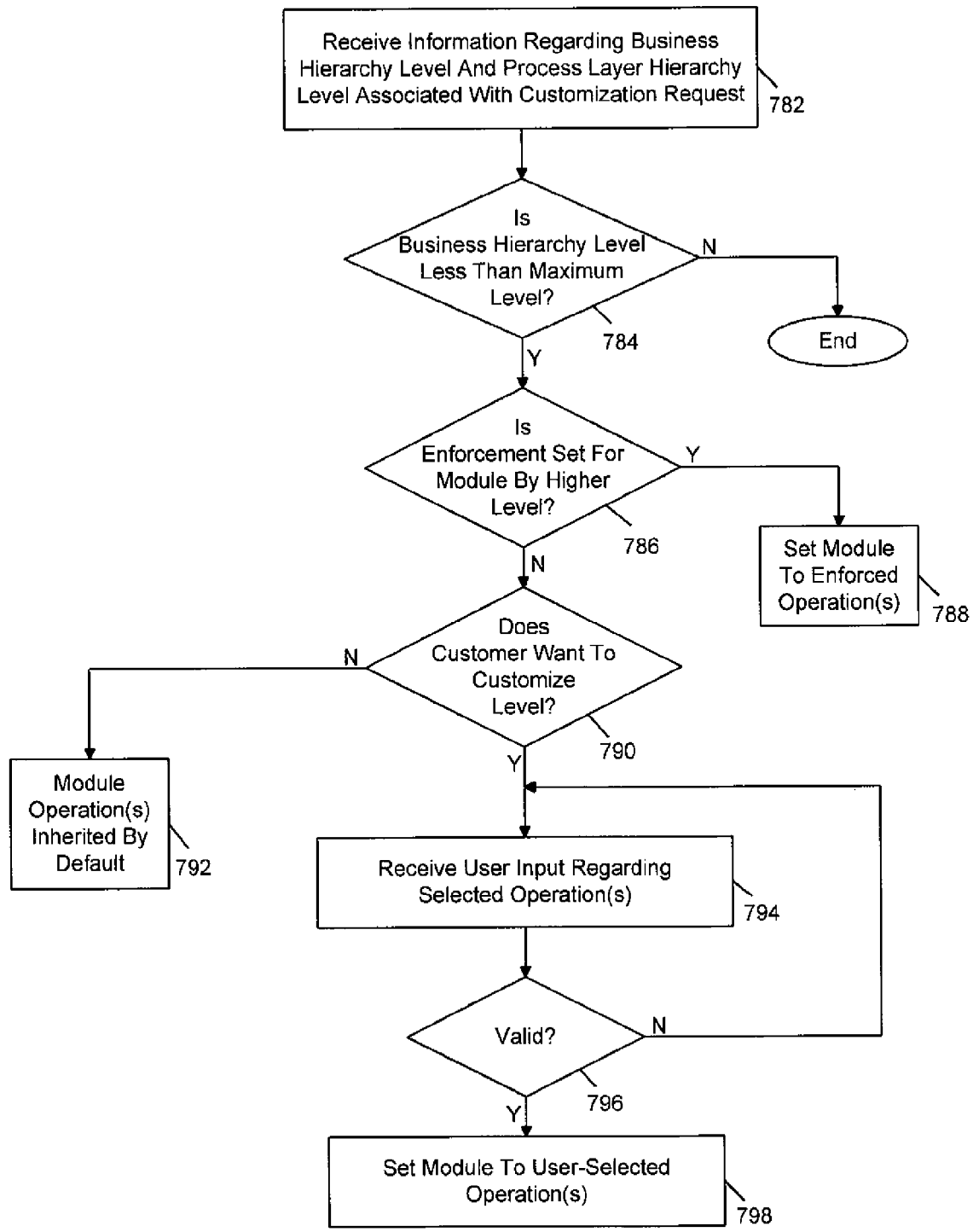
FIG. 11 is a flow diagram of generating a customized process in accordance with an embodiment of the present invention.

Reference can now be made to FIG. 11, which is a flow diagram of generating a customized process in accordance with an embodiment of the present invention. As shown in FIG. 11, a method 700 may be used to perform process customization for a given customer. Method 700 may be performed during process customization in a process customization module which may be part of a process determination module, e.g., the process determination engine of FIG. 9, when triggered by a user, e.g., an account representative or a customer itself.

Note that customization of a process may be performed on a module-by-module basis. That is, with regard to any given process it may be subdivided into modular components that slice and dice the process for modular process management. During customization, possible elements of one or more modules of a global process to handle a given event may be extracted using customer selection and custom set overrides. That is, for a particular event, various process steps are possible and all of these possible steps can be identified and extracted using customer selections and custom set overrides, which may correspond to directives or enforcement by an inheritance model. That is, higher level business units in the hierarchy and process layer levels can dictate that a particular operation is to occur for a given event, and can enforce this dictate to the lower levels of a hierarchy for the business unit and/or process layer.

Thus inheritance and enforcement can occur when customizing a given process. Referring now to FIG. 11, shown is a flow diagram of further details of how an inheritance model and enforcement operations can be realized in one embodiment. More specifically, the operations performed in method 700 may be for a given module of a multi-process module for which customization is desired. As seen in FIG. 11, method 700 may begin by receiving information regarding a business hierarchy level and a process layer hierarchy level associated with a customization request. The process customization module can access this information to determine the hierarchy level. Control then passes to diamond 784, where it may be determined whether a business hierarchy associated with the request is less than a maximum level. Thus for any entity other than corporate level entity, e.g., of a multi-tenant host environment, the business hierarchy will be determined to be less than the maximum level (otherwise the method of FIG. 11 concludes).

Accordingly, control passes to diamond 786, where it may be determined whether enforcement is set for a given module by a higher level. If so, control passes to block 788, where the module can't be modified, as its set to the enforced operation(s). That is, when a higher level business entity of the business hierarchy determines that it desires a given module to be enforced for all lower levels of the hierarchy, the ability to customize that module by a lower level entity is no longer available for that process level and below.

If instead it is determined that enforcement is not set, control passes from diamond 786 to diamond 790, where it may be determined whether the customer wants to customize the given module. If not, control passes to block 792, where no action needs to be taken on that module, as its set to one or more inherited operations by default. That is, because the customer does not wish to customize this given module, its operations are inherited from a higher level in the business hierarchy. In particular embodiments, the inheritance may be from the immediately preceding level above a given customer's level or higher, although the scope of the present invention is not limited in this regard.

Referring still to FIG. 11, if instead it is determined that customization is desired, control passes to block 794. At block 794, a user input may be received regarding the selected operation(s). Here user input may be received to indicate the one or more operations to be performed for the given module. Note that in many implementations, the range of user-selected operations may be limited to those available to a user in a graphical user interface. For example, for a given module a scroll down or other user-selectable set of operations may be displayed to the user to thus set the one or more operations to be performed for the given module.

Still referring to FIG. 11, control then passes to diamond 796, where it may be determined whether the user-selected operations are valid. That is, in some embodiments only a limited number of operations may be allowed for a given user or module. Thus if the user selections are in variance with such a predetermined list of authorized operations, control can pass back to block 794 to receive additional user input for authorized operations. If instead at diamond 796 it is determined that the selected operations are valid, control passes to block 798, where the module may be set to the user-selected operation(s). Thus processing may be completed with regard to a particular user for customization of a particular module. In a multi-module process, the method of FIG. 11 may be executed for each module of the process. While shown this particular implementation in the embodiment of FIG. 11, the scope of the present invention is not so limited.

Figure 12A:
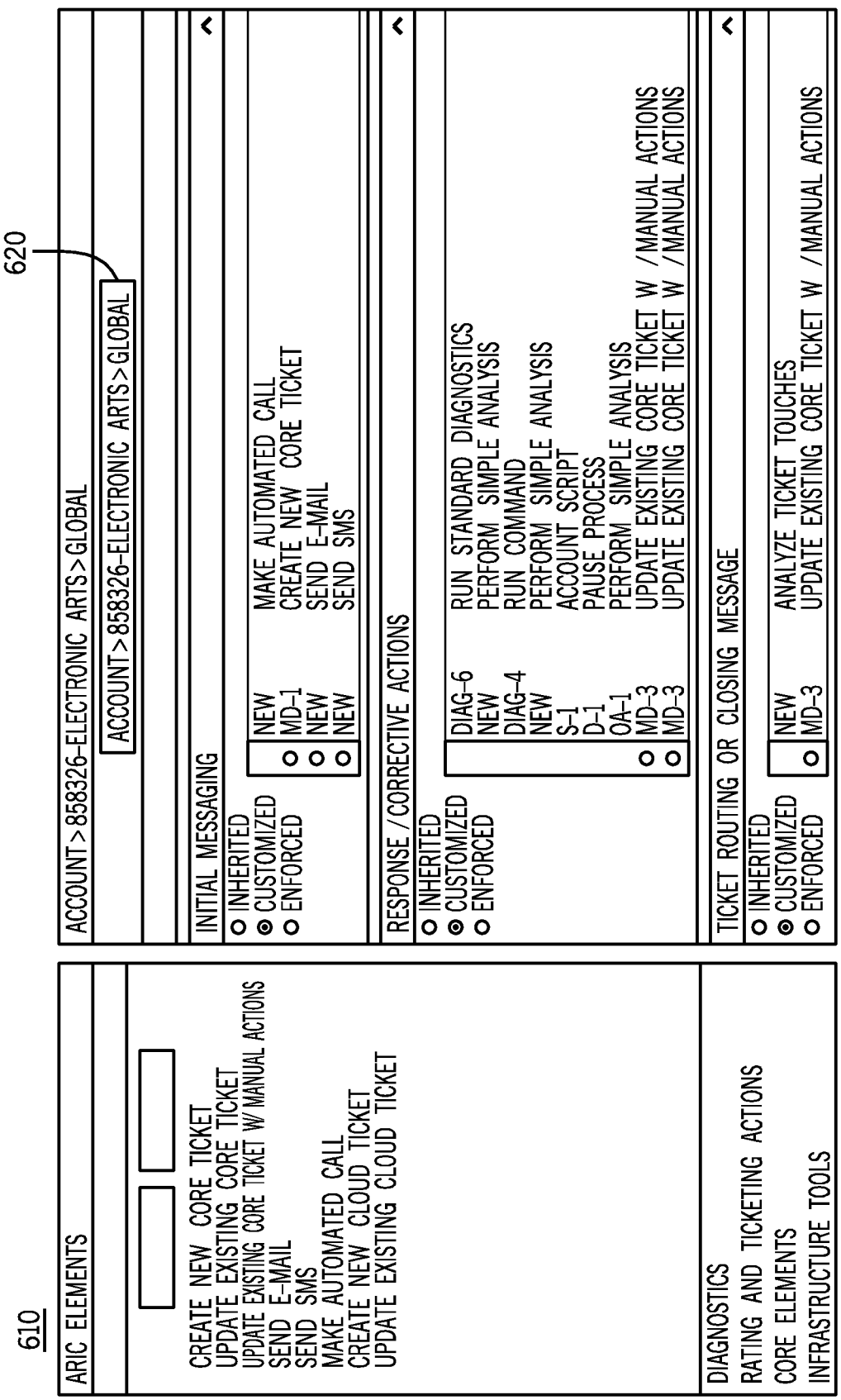

Referring now to FIGS. 12A-12D, shown are example graphical user interfaces for a process customization module in accordance with an embodiment of the present invention. As shown in FIG. 12A, user interface may provide an editor function to enable a non-technical user to add/modify/delete existing operations in a given process for a particular entity. As shown by user interface 610, a palette of potential steps is provided where steps can be added to the process, reflected in builder panel 620. In relevant parts, note that the user interface includes a set of tabs 620 that can be used to access the different phases/modules of a process. In the illustration of FIG. 12A, an initial phase is selected and is shown to include several different modules and several different elements, namely an initial messaging module, a response/corrective action module, and a ticket routing or closing message module. As seen, each of these modules can be customized, and each such customized modules can include multiple elements that can be created/modified/deleted, e.g., using intuitive user-interface functionality such as click, drag and drop or so forth. Note that instead of having customized operations for this module, one or more functions of the module can be inherited or enforced for particular entities.

Figure 12B:
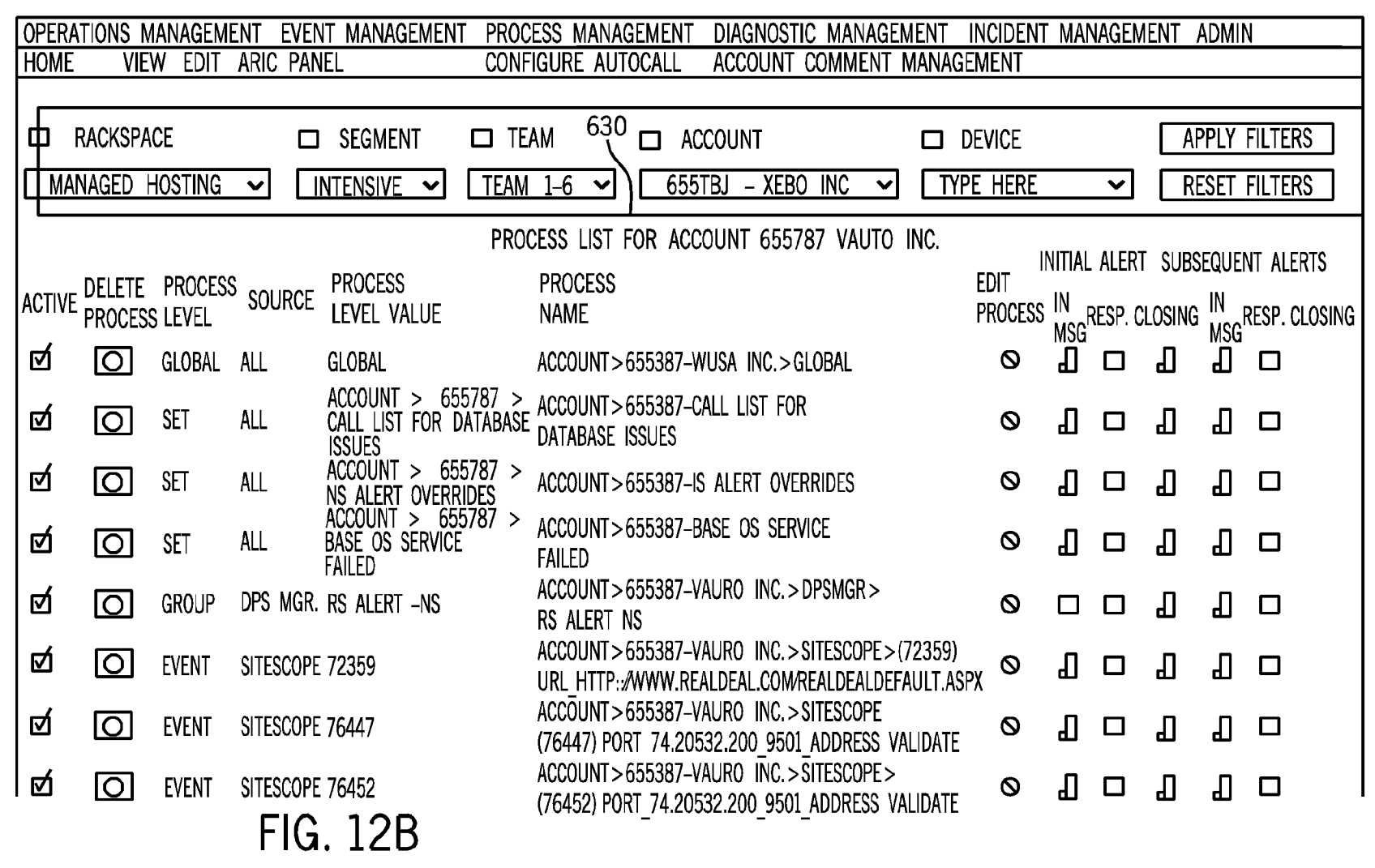

Referring now to FIG. 12B, shown is another user interface that provides a process list 630 for a given entity. Different customized processes at different process levels are shown, each of which can include various identification information. In addition, particularized modules of process can be identified, for these modules may be indicated, e.g., by icons whether the given element or operation is inherited/customized/enforced.

Figure 12C:
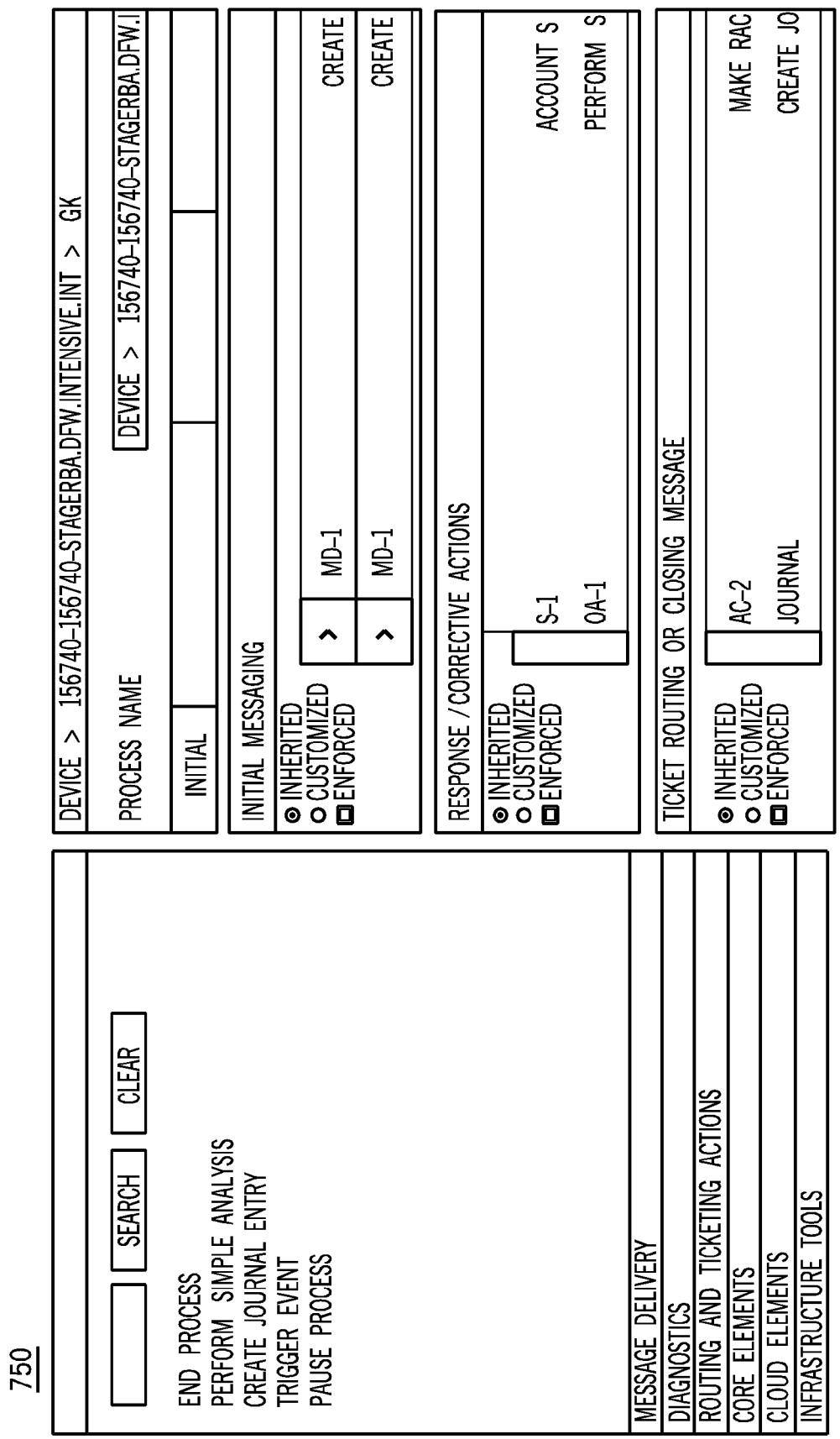

FIG. 12C shows an example user interface for customizing operations at a conclusion of a process. As seen, user interface 750 includes various process elements available in one of many process element categories, such as end process, output analysis, journal, insert entry, and delay. One or more of these various processes elements can be added to the process, then selected and customized for given entities. In one embodiment, the end process element may allow a user to end a process anywhere within the process. The output analysis operation may allow a user to analyze an output of one or more operations within a process, and further may provide for analysis of the event itself so that a user may define different actions based on desired criteria. The journal operation may provide a user the ability to create a customized journal of events and/or actions taken responsive to this event. The insert event operation may allow a user to trigger one or more additional events/processes from within a process, and finally the delay operation may allow a user to delay execution of one or more steps within a process as desired. Other process Element Categories could include Internal Ticketing Elements (Create Ticket, Update Ticket, Move Ticket, Assign Ticket, etc.), Message Delivery (Send Email, Send SMS, Send Instant Message, Make Automated Call, Initiate Social Networking Actions, etc.), Diagnostics/Remediation (Run Command, Run Script, Trigger Webservice Call, Delete files, Restart Services, Trigger Stored Function, etc), Other Services & Third-Party tools/actions/etc.

Referring now to FIG. 12D, shown is an example user interface for customizing an element of a process module in accordance with an embodiment of the present invention. As shown in FIG. 12D, a send email element of a process module can include various sub-elements, each of which can be customized as shown in the user interface. If a user decides not to customize a given sub-element, the sub-element may instead be inherited from a higher level within a hierarchy. These sub-elements may be modified through text input or by drag and drop of variables objects represented in the left panel. These variables may be dynamic variables or static variables stored in other databases.

Embodiments may be implemented in code and may be stored on a storage medium having stored thereon instructions which can be used to program a system to perform the instructions. The storage medium may include, but is not limited to, any type of non-transitory storage medium including optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving, in a process determination module of a first computer system, an event occurring on a second system of a multi-tenant environment of a data center coupled to the first computer system, the second system associated with a first customer of the data center;
accessing a process stack of a storage coupled to the process determination module, the process stack including a matrix for a process associated with the event, the process including a plurality of modules each formed of one or more elements corresponding to steps to be performed, the matrix including for each of the modules a respective set of entries, wherein each entry corresponds to a business unit entity of a plurality of business unit entities and has a value that is one of a customized value, an enforced value, and an inherited value, wherein the plurality of business unit entities are hierarchically arranged in the matrix to define a plurality of business hierarchy levels;
generating from the process stack an execution stack for the process, the execution stack including, for each of the modules, a respective list of entries comprising each entry from the respective entry set of the module which has either a customized value or an enforced value;
selecting, in accordance with a first layer of inheritance analysis on the execution stack, an entry from each of the lists, building an actual process from the selected entries, and storing the actual process in a process action matrix, wherein the first layer of inheritance analysis includes for each list:
determining if one or more entries of the list have an enforced value;
when the determination is positive, selecting the entry of the one or more entries having the enforced value with the highest corresponding business hierarchy level to be the selected entry; and
when the determination is negative, selecting the entry of the list having the customized value with the lowest corresponding business hierarchy level to be the selected entry;
determining a lifecycle of the process based at least in part on information obtained with the event;
based on the lifecycle, accessing one or more modules of the actual process to determine actual process steps, including detailed operations, and storing the actual process steps in a process action elements table;
utilizing the process action matrix and the process action elements table to obtain instructions stored in a second storage for the actual process steps; and
executing the instructions in one or more control engines of the data center to perform the actual process.

2. The method of claim 1, wherein determining the actual process steps includes performing a second layer of inheritance analysis on the selected entry of the actual process and at least some entries of the execution stack to determine detailed operations to be performed for each step, wherein each module element is formed of one or more sub-elements which provide the detailed operations.

3. The method of claim 2, wherein performing the second level of inheritance analysis includes, for each element of the selected modules:
determining whether any sub-element entry for the element in the execution stack has an enforced value;

when the determination is positive, setting the detailed operations to those provided by the sub-element identified by the enforced entry with highest corresponding business hierarchy level entry; and when the determination is negative, setting the detailed operations to those provided by the sub-element identified by a lowest business hierarchy level entry having the customized value.

4. The method of claim 3, further comprising storing a pointer to the identified sub-element in the process action elements table, wherein the pointer is to be used to access one or more instructions to perform the detailed operations of the identified sub-element.

5. The method of claim 4, further comprising providing the pointer to a process control master and setting a flag associated with the pointer to indicate that the detailed operations of the sub-element are ready to be executed.

6. The method of claim 1, further comprising receiving a request for customization of the process, the request including a business hierarchy level and a process layer hierarchy level associated with the request and a requester of the customization.

7. The method of claim 6, further comprising if no enforcement policy is set for a first module, determining whether the requester desires to customize the first module, and if so, receiving one or more customized operations for the first module.

8. The method of claim 7, further comprising storing unique identifiers for the one or more customized operations in a process stack.

9. The method of claim 7, further comprising if the requester does not desire to customize the first module, inheriting operations of the module to be the same as for a next higher business hierarchy level where module is customized.

10. A server system of a data center, the system comprising:
a processor;
one or more computer-readable storage media storing instructions which, when executed by the processor, cause the server system to perform steps comprising:
receiving an event occurring on a managed system of a multi-tenant environment;
accessing a process stack stored in one of the storage media, the process stack including a matrix for a process associated with the event, the process including a plurality of modules each formed of one or more elements corresponding to steps to be performed, the matrix including for each of the modules a respective set of entries, wherein each entry corresponds to a business unit entity of a plurality of business unit entities and has a value that is one of a customized value, an enforced value, and an inherited value, wherein the plurality of business unit entities are hierarchically arranged in the matrix to define a plurality of business hierarchy levels;
generating from the process stack an execution stack for the process, the execution stack including, for each of the modules, a respective list of entries comprising each entry from the respective entry set of the module which has either a customized value or an enforced value;
selecting, in accordance with a first layer of inheritance analysis on the execution stack, an entry from each of the lists, building an actual process from the selected entries, and storing the actual process in a process action matrix, wherein the first layer of inheritance analysis includes for each list:
determining if one or more entries of the list have an enforced value;
when the determination is positive, selecting the entry of the one or more entries having the enforced value with the highest corresponding business hierarchy level to be the selected entry; and
when the determination is negative, selecting the entry of the list having the customized value with the lowest corresponding business hierarchy level to be the selected entry;
determining a lifecycle of the process based at least in part on information obtained with the event;
based on the lifecycle, accessing one or more modules of the actual process to determine actual process steps, including detailed operations, and storing the actual process steps in a process action elements table;
utilizing the process action matrix and the process action elements table to obtain process instructions stored in one of the storage media for the actual process steps; and
executing the process instructions in one or more control engines of the server to perform the actual process.

11. The server system of claim 10, wherein determining the actual process steps includes performing a second layer of inheritance analysis on the selected entry of the actual process and at least some entries of the execution stack to determine detailed operations to be performed for each step, wherein each module element is formed of one or more sub-elements which provide the detailed operations.

12. The server system of claim 11, wherein performing the second level of inheritance analysis includes, for each element of the selected modules:
determining whether any sub-element entry for the element in the execution stack has an enforced value;
when the determination is positive, setting the detailed operations to those provided by the sub-element identified by the enforced entry with highest corresponding business hierarchy level entry; and
when the determination is negative, setting the detailed operations to those provided by the sub-element identified by a lowest business hierarchy level entry having the customized value.

13. The server system of claim 12, further comprising storing a pointer to the identified sub-element in the process action elements table, wherein the pointer is to be used to access one or more instructions to perform the detailed operations of the identified sub-element.

14. The server system of claim 13, further comprising providing the pointer to a process control master and setting a flag associated with the pointer to indicate that the detailed operations of the sub-element are ready to be executed.

* * * * *